(12) United States Patent
Qiao

(10) Patent No.: US 12,634,170 B2
(45) Date of Patent: May 19, 2026

(54) INDICATION METHOD, INDICATION APPARATUS, AND STORAGE MEDIUM

(71) Applicant: Beijing Xiaomi Mobile Software Co., Ltd., Beijing (CN)

(72) Inventor: Xuemei Qiao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 259 days.

(21) Appl. No.: 18/553,100

(22) PCT Filed: Apr. 1, 2021

(86) PCT No.: PCT/CN2021/085097
§ 371 (c)(1),
(2) Date: Sep. 28, 2023

(87) PCT Pub. No.: WO2022/205372
PCT Pub. Date: Oct. 6, 2022

(65) Prior Publication Data
US 2024/0187281 A1      Jun. 6, 2024

(51) Int. Cl.
*H04L 25/02* (2006.01)

(52) U.S. Cl.
CPC ................................ *H04L 25/0204* (2013.01)

(58) Field of Classification Search
None
See application file for complete search history.

(56) References Cited

U.S. PATENT DOCUMENTS

| | | | | |
|---|---|---|---|---|
| 12,519,595 | B2* | 1/2026 | Ly | H04L 5/0051 |
| 2009/0036078 | A1* | 2/2009 | Kong | H04L 5/0051 |
| | | | | 455/226.1 |
| 2010/0195600 | A1* | 8/2010 | Gorokhov | H04L 5/0003 |
| | | | | 370/329 |
| 2011/0310786 | A1* | 12/2011 | Qin | H04W 72/1263 |
| | | | | 370/312 |
| 2013/0142150 | A1* | 6/2013 | Zhou | H04L 25/0226 |
| | | | | 370/329 |
| 2014/0010268 | A1* | 1/2014 | Yu | H04L 27/26134 |
| | | | | 375/219 |
| 2019/0222380 | A1* | 7/2019 | Manolakos | H04L 25/0224 |
| 2020/0021466 | A1* | 1/2020 | Da Silva | H04L 25/0242 |
| 2020/0068541 | A1* | 2/2020 | Zhang | H04W 76/27 |
| 2020/0260423 | A1 | 8/2020 | Ma et al. | |

(Continued)

FOREIGN PATENT DOCUMENTS

| | | |
|---|---|---|
| CN | 111245585 A | 6/2020 |
| WO | 2018097582 A1 | 5/2018 |

(Continued)

OTHER PUBLICATIONS

Office Action for Indian application No. 202347074269, dated May 22, 2025.

(Continued)

*Primary Examiner* — Otis L Thompson, Jr.
(74) *Attorney, Agent, or Firm* — Finnegan, Henderson, Farabow, Garrett & Dunner, L.L.P.

(57) ABSTRACT
An indication method is performed by a terminal, and includes: determining a first message, wherein the first message indicates a configuration parameter of joint channel estimation of a network device.

17 Claims, 6 Drawing Sheets

--- based on the configuration parameter, determining a first parameter in the parameter set, or determining the fixed parameter value as the first parameter

S21 determining the length of the TDW for performing joint channel estimation based on the first parameter

S22

(56) References Cited

U.S. PATENT DOCUMENTS

| | | | | |
|---|---|---|---|---|
| 2020/0319329 | A1* | 10/2020 | Shahar-Doron | .... H04L 25/0228 |
| 2022/0116082 | A1* | 4/2022 | Ly | .......................... H04L 5/0051 |
| 2022/0279455 | A1* | 9/2022 | Cozzo | ................... H04W 52/08 |
| 2022/0294667 | A1* | 9/2022 | Ly | .......................... H04L 5/0094 |
| 2022/0312409 | A1* | 9/2022 | Taherzadeh Boroujeni | ................ H04W 24/08 |
| 2022/0321389 | A1* | 10/2022 | Taherzadeh Boroujeni | ................ H04L 25/0224 |
| 2022/0360472 | A1* | 11/2022 | Wang | .................. H04W 52/367 |
| 2023/0291523 | A1* | 9/2023 | Hasegawa | ........... H04W 52/281 |
| 2023/0354305 | A1* | 11/2023 | Xu | ....................... H04W 72/231 |
| 2023/0421327 | A1* | 12/2023 | Ly | ....................... H04W 72/232 |
| 2024/0114490 | A1* | 4/2024 | Bhamri | ................. H04L 5/0012 |
| 2024/0163011 | A1* | 5/2024 | Hasegawa | ............. H04L 1/0071 |
| 2024/0179688 | A1* | 5/2024 | Echigo | .............. H04W 72/0446 |

FOREIGN PATENT DOCUMENTS

| | | |
|---|---|---|
| WO | WO 2019068739 A1 | 4/2019 |
| WO | 2019096169 A1 | 5/2019 |
| WO | WO 2020030254 A1 | 2/2020 |

OTHER PUBLICATIONS

First Office Action for Chinese Application No. 202180001027.0, dated Jun. 1, 2022, 18 pages.

Second Office Action for Chinese Application No. 202180001027.0, dated Dec. 28, 2022, 18 pages.

International Search Report and Written Opinion of International Application No. PCT/CN2021/085097, dated Dec. 24, 2021, 13 pages.

InterDigital Inc., "Discussion on PUCCH enhancements," 3GPP TSG RAN WG1 #104-e, R1-2100747, e-Meeting, Jan. 25-Feb. 5, 2021, 5 pages.

Request for the Submission of an Opinion for Korean Application No. 10-2023-7037291, dated Feb. 4, 2024, 25 pages.

Qualcomm, Incorporated, "Joint channel estimation for PUSCH," 3GPP TSG-RAN WG1 Meeting #104-e, R1-2101479, e-Meeting, Jan. 25-Feb. 5, 2021, 4 pages.

"RAN1 Chairman's Notes," 3GPP TSG RAN WG1 Meeting #104-e, e-Meeting, Jan. 25-Feb. 5, 2021, 65 pages.

Intel Corporation, "On Msg3 PUSCH repetition," 3GPP TSG RAN WG1 #104-e, R1-2100669, e-Meeting, Jan. 25-Feb. 5, 2021, 5 pages.

European Patent Office, Extended European Search Report issued in Application No. 21934030.4 dated Feb. 8, 2024, 13 pages.

Moderator (China Telecom), "[104-e-NR-CovEnh03] Summary of email discussion on joint channel estimation for PUSCH," 3GPP TSG RAN WG1 Meeting #104-e, R1-2102161, E-Meeting, Jan. 25-Feb. 5, 2021, 92 pages.

Moderator (ZTE Corporation), "Feature lead summary on support of Type A PUSCH repetitions for Msg3," 3GPP TSG RAN WG1 #104-e, R1-2102226, e-Meeting, Jan. 25-Feb. 5, 2021, 78 pages.

Xiaomi, "Discussion on Type A PUSCH repetition for Msg3," 3GPP TSG RAN WG1 #104-e, R1-2101130, e- Meeting, Jan. 25-Feb. 5, 2021, 5 pages.

Moderator (China Telecom), "[102-e-NR-CovEnh-03] E-mail discussion/approval on PUSCH coverage enhancement", 3GPP TSG RAN WG1 Meeting #102-e, R1-20xxxxx, E-Meeting, Aug. 17-28, 2020, 56 pages.

Hearing Notice for India Application No. 202347074269, dated Feb. 27, 2026, 3 pages.

\* cited by examiner

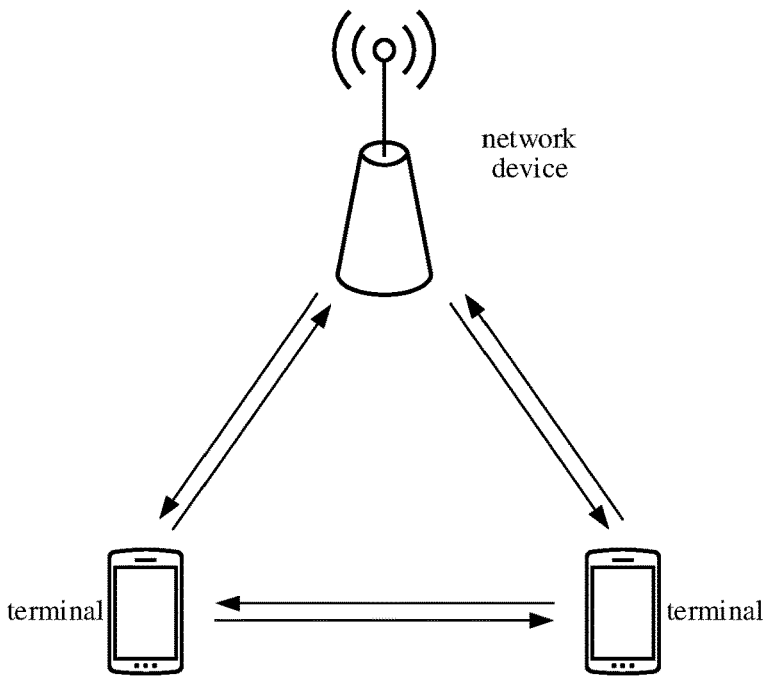

FIG. 1

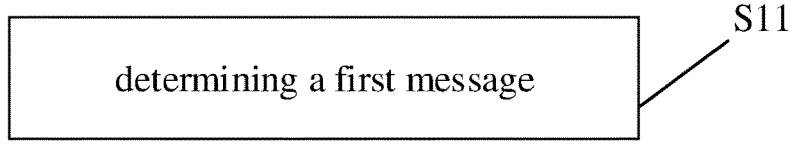

determining a first message ⟋S11

FIG. 2

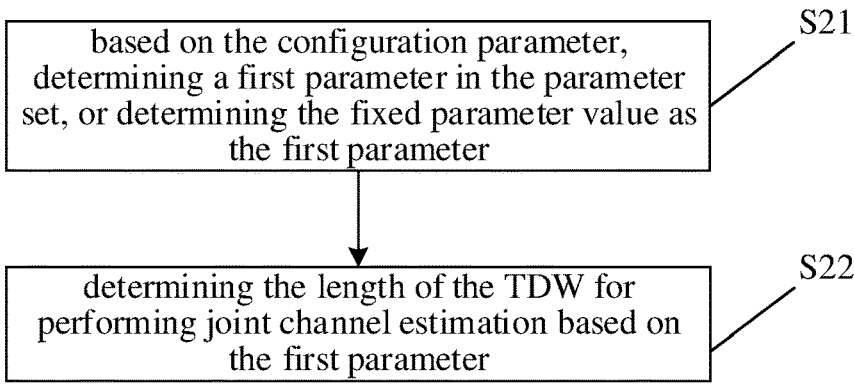

based on the configuration parameter, determining a first parameter in the parameter set, or determining the fixed parameter value as the first parameter ⟋S21 determining the length of the TDW for performing joint channel estimation based on the first parameter ⟋S22

FIG. 3 determining the first parameter as the length of the TDW for performing joint channel estimation ⟋S31

FIG. 4 determining a transmission time period corresponding to the number of repetitions, and performing the joint channel estimation based on a first strategy in response to the transmission time period being less than the first parameter

Figures 5, 6, 7, 8, 9, 10:
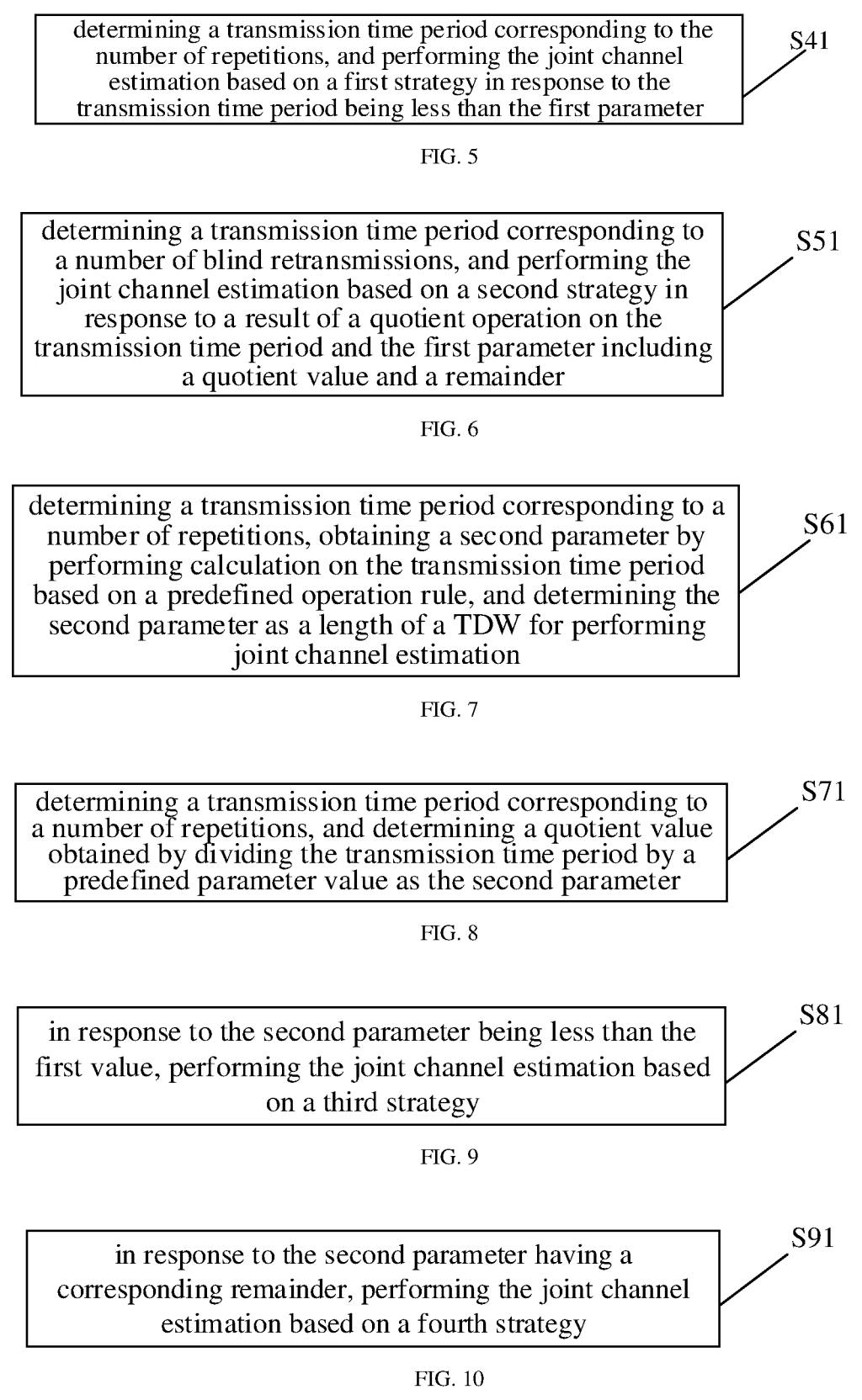

S41

FIG. 5 determining a transmission time period corresponding to a number of blind retransmissions, and performing the joint channel estimation based on a second strategy in response to a result of a quotient operation on the transmission time period and the first parameter including a quotient value and a remainder

S51

FIG. 6 determining a transmission time period corresponding to a number of repetitions, obtaining a second parameter by performing calculation on the transmission time period based on a predefined operation rule, and determining the second parameter as a length of a TDW for performing joint channel estimation

S61

FIG. 7 determining a transmission time period corresponding to a number of repetitions, and determining a quotient value obtained by dividing the transmission time period by a predefined parameter value as the second parameter

S71

FIG. 8 in response to the second parameter being less than the first value, performing the joint channel estimation based on a third strategy

S81

FIG. 9 in response to the second parameter having a corresponding remainder, performing the joint channel estimation based on a fourth strategy

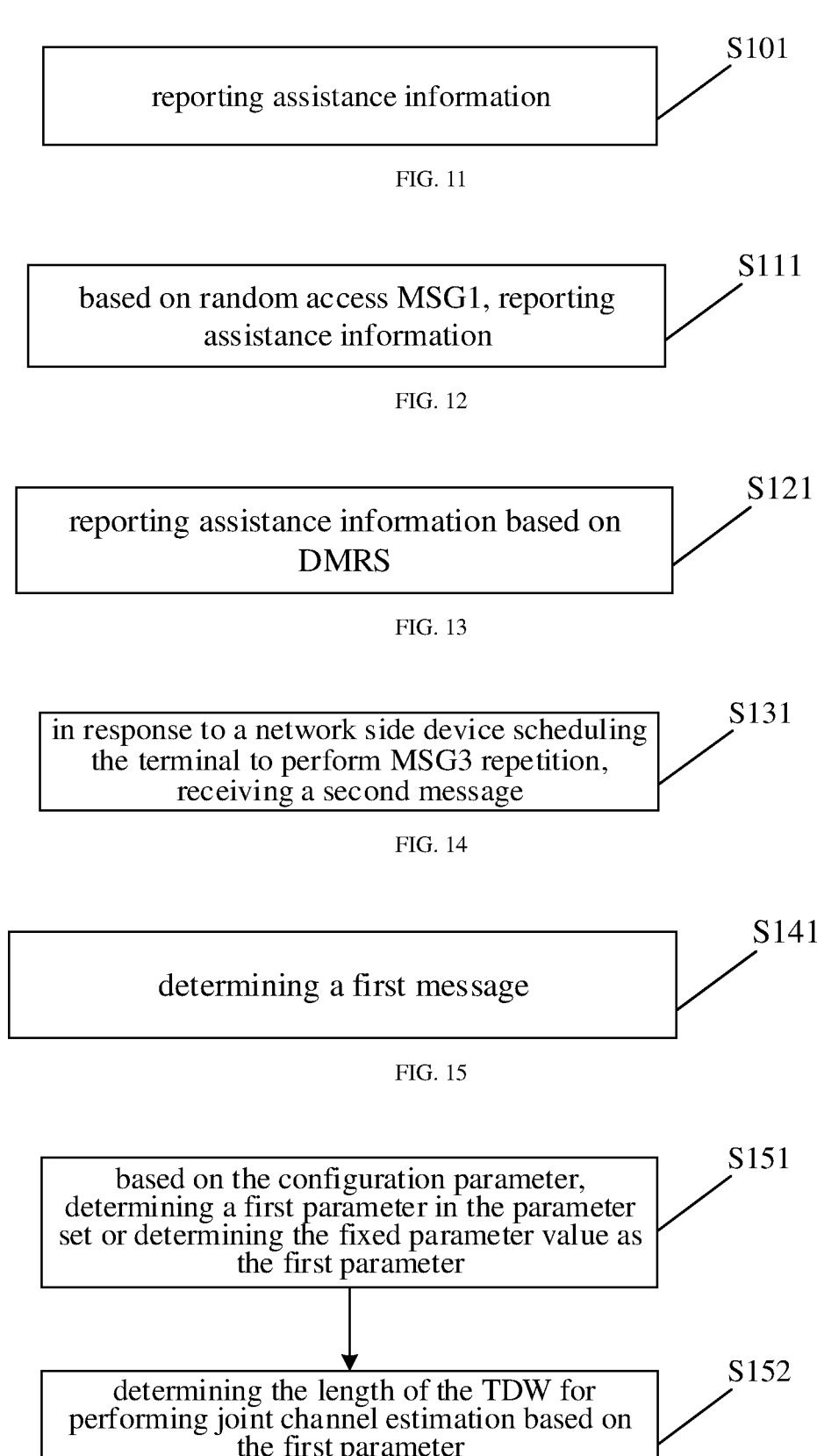

S101 reporting assistance information

FIG. 11

S111 based on random access MSG1, reporting assistance information

FIG. 12

S121 reporting assistance information based on DMRS

FIG. 13

S131 in response to a network side device scheduling the terminal to perform MSG3 repetition, receiving a second message

FIG. 14

S141 determining a first message

FIG. 15

S151 based on the configuration parameter, determining a first parameter in the parameter set or determining the fixed parameter value as the first parameter

S152 determining the length of the TDW for performing joint channel estimation based on the first parameter

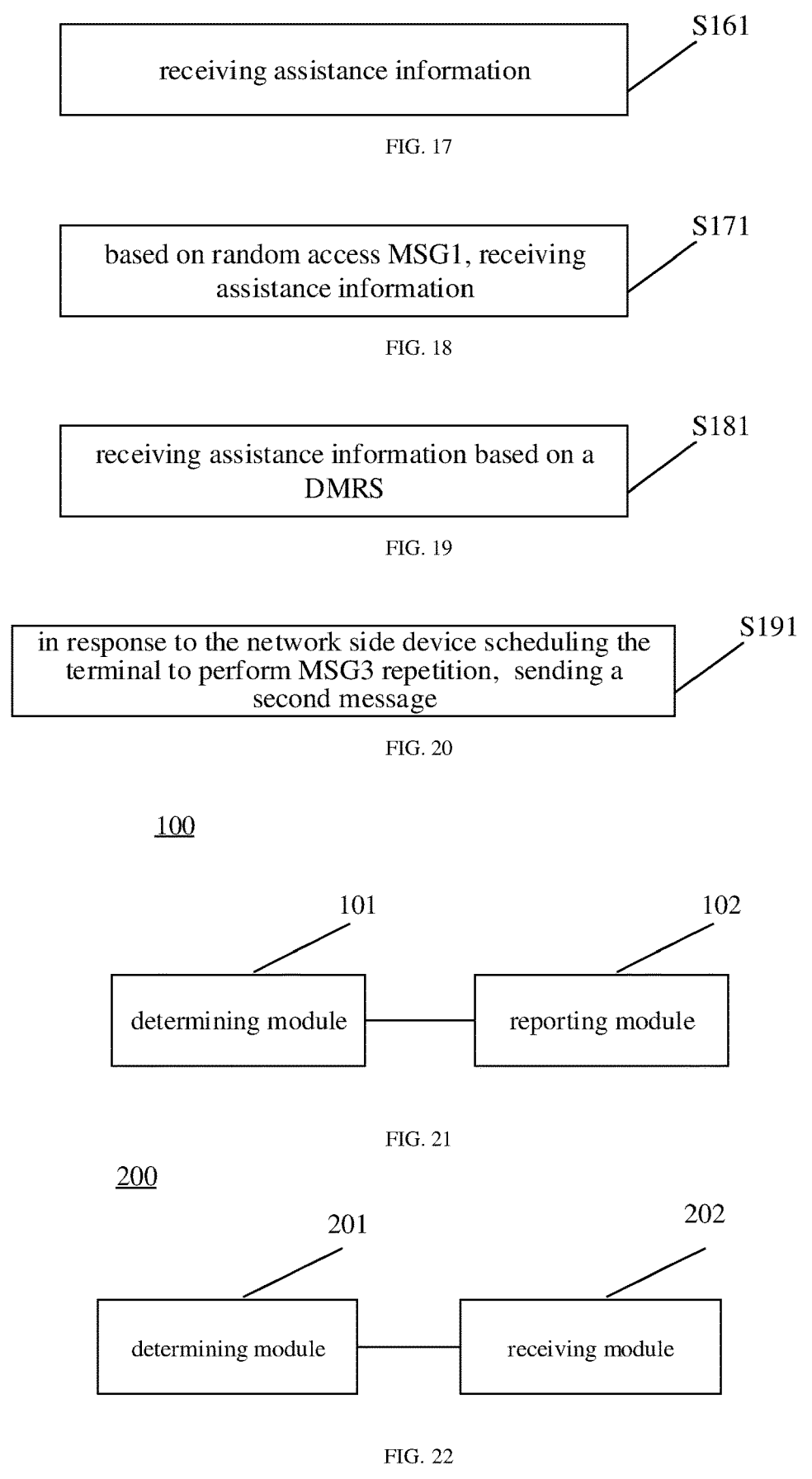

| receiving assistance information |
|---|

| based on random access MSG1, receiving assistance information |
|---|

| receiving assistance information based on a DMRS |
|---|

| in response to the network side device scheduling the terminal to perform MSG3 repetition, sending a second message |
|---|

| determining module | — | reporting module |
|---|---|---|

| determining module | — | receiving module |
|---|---|---|

FIG. 22

INDICATION METHOD, INDICATION APPARATUS, AND STORAGE MEDIUM

CROSS REFERENCE TO RELATED APPLICATIONS

This application is a U.S. national phase of International Application No. PCT/CN2021/085097, filed on Apr. 1, 2021, the entire contents of which are incorporated herein by reference.

TECHNICAL FIELD

The disclosure relates to a wireless communication system, in particular to an indication method, an indication apparatus, and a storage medium.

BACKGROUND

Joint channel estimation has been proposed in the new generation version of communication technology to enhance the coverage of Physical Uplink Shared Channel (PUSCH). Taking a base station (such as a gNB) as an example of a network side device, for the joint channel estimation, both the base station (such as the gNB) and a terminal (User Equipment, UE) need a Time Domain Window (TDW), during which the UE is expected to maintain power consistency and phase continuity to cooperate with the base station (such as the gNB) to perform the joint channel estimation within the TDW.

In the related art, supporting of MSG3 repetition and across-slot joint channel estimation are proposed. However, in practice, it has been found that the terminal cannot maintain power consistency or phase continuity during the joint channel estimation performed by the base station (such as the gNB).

SUMMARY

According to a first aspect of the disclosure, an indication method is provided. The indication method is performed by a terminal, and includes:

determining a first message, in which the first message is used to indicate a configuration parameter of joint channel estimation of a network side device.

According to a second aspect of the disclosure, an indication method is provided. The indication method is performed by a network side device, and includes:

determining a first message, in which the first message is used to indicate a configuration parameter for the network side device to perform joint channel estimation.

According to a third aspect of the disclosure, an indication device is provided. The indication device includes:

a processor; a memory for storing instructions executable by the processor. The processor is configured execute the indication method in the first aspect or any implementation of the first aspect, or execute the indication method in the second aspect or any implementation of the second aspect.

According to a fourth aspect of the disclosure, a non-transitory computer-readable storage medium is provided. When instructions in the storage medium are executed by a processor of a mobile terminal, the mobile terminal is enabled to implement the indication method in the first aspect or any implementation of the first aspect, or execute the indication method in the second aspect or any implementation of the second aspect.

It should be understood that the above general description and the following detailed descriptions are exemplary and explanatory only and do not limit the disclosure.

BRIEF DESCRIPTION OF THE DRAWINGS

The accompanying drawings, which are incorporated in and constitute a part of this description, illustrate embodiments consistent with the disclosure and together with the description serve to explain the principles of the disclosure.

FIG. 1 is an architecture diagram of a communication system between a network device and a terminal according to an embodiment of the disclosure.

FIG. 2 is a flowchart of an indication method according to an embodiment of the disclosure.

FIG. 3 is a flowchart of an indication method according to an embodiment of the disclosure.

FIG. 4 is a flowchart of an indication method according to an embodiment of the disclosure.

FIG. 5 is a flowchart of an indication method according to an embodiment of the disclosure.

FIG. 6 is a flowchart of an indication method according to an embodiment of the disclosure.

FIG. 7 is a flowchart of an indication method according to an embodiment of the disclosure.

FIG. 8 is a flowchart of an indication method according to an embodiment of the disclosure.

FIG. 9 is a flowchart of an indication method according to an embodiment of the disclosure.

FIG. 10 is a flowchart of an indication method according to an embodiment of the disclosure.

FIG. 11 is a flowchart of an indication method according to an embodiment of the disclosure.

FIG. 12 is a flowchart of an indication method according to an embodiment of the disclosure.

FIG. 13 is a flowchart of an indication method according to an embodiment of the disclosure.

FIG. 14 is a flowchart of an indication method according to an embodiment of the disclosure.

FIG. 15 is a flowchart of an indication method according to an embodiment of the disclosure.

FIG. 16 is a flowchart of an indication method according to an embodiment of the disclosure.

FIG. 17 is a flowchart of an indication method according to an embodiment of the disclosure.

FIG. 18 is a flowchart of an indication method according to an embodiment of the disclosure.

FIG. 19 is a flowchart of an indication method according to an embodiment of the disclosure.

FIG. 20 is a flowchart of an indication method according to an embodiment of the disclosure.

FIG. 21 is a block diagram of an indication apparatus according to an embodiment of the disclosure.

FIG. 22 is a block diagram of an indication apparatus according to an embodiment of the disclosure.

DETAILED DESCRIPTION

Figure 23:
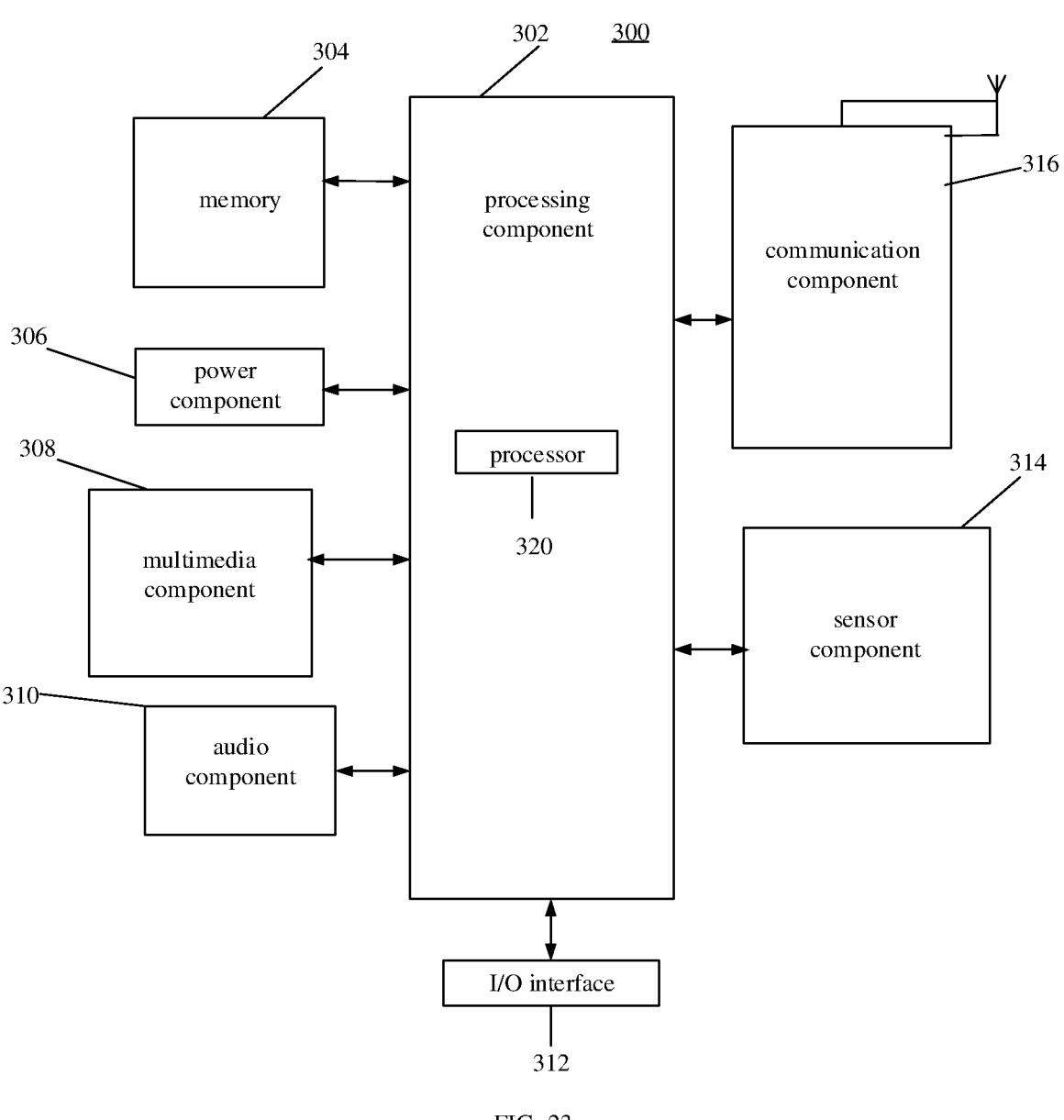
FIG. 23 is a block diagram of a device for indication according to an embodiment of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

FIG. 1 is an architecture diagram of a communication system between a network device and a terminal according to an embodiment. A communication method provided in the disclosure may be applied to the communication system architecture diagram shown in FIG. 1. As shown in FIG. 1, a network side device may send signaling based on the architecture shown in FIG. 1.

It can be understood that the communication system between the network device and the terminal shown in FIG. 1 is only a schematic explanation, and the wireless communication system may also include other network devices, such as a core network device, a wireless relay device, and a wireless return device, which are not shown in FIG. 1. Embodiments of the disclosure do not limit the number of network devices and the number of terminals included in the wireless communication system.

It can be further understood that the wireless communication system of embodiments of the disclosure is a network that provides a wireless communication function. The wireless communication system can adopt different communication technologies, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), carrier sense multiple access with collision avoidance. According to factors such as capacity, speed, and latency of different networks, the networks can be divided into 2G (generation) networks, 3G networks, 4G networks, or future evolution networks, such as 5G networks, which can also be referred to as New Radio (NR). For the convenience of description, a wireless communication network is sometimes referred to as a network in the disclosure.

Further, the network device involved in the disclosure can also be referred to as a wireless access network device. The wireless access network device can be: a base station, an evolved node B (base station), a home base station, an access point (AP) in a wireless fidelity (WIFI) system, a wireless relay node, a wireless return node, a transmission point (TP) or a transmission and reception point (TRP), etc., can also be a gNB in the NR system, or, can also be a component or part of devices that constitute the base station. When it used as a vehicle to everything (V2X) communication system, the network device can also be a vehicle-mounted device. It should be understood that, in the embodiments of the disclosure, the specific technology and the specific device form adopted by the network device are not limited.

Further, the terminal involved in this disclosure can also be referred to as a terminal device, user equipment (UE), a mobile station (MS), a mobile terminal (MT), etc., which is a kind of device that provides a user with voice and/or data connectivity. For example, the terminal may be a handheld device with a wireless connection function, a vehicle-mounted device, etc. Currently, some examples of the terminal are: a smart phone (or a mobile phone), a pocket personal computer (PPC), a handheld computer, a personal digital assistant (PDA), a notebook computer, a tablet computer, a wearable device, or a vehicle-mounted device, etc.

In addition, when it is a V2X communication system, the terminal device may also be a vehicle-mounted device. It should be understood that the embodiments of the disclosure do not limit the specific technology and the specific device form adopted by the terminal.

Joint channel estimation has been proposed in the new generation version of communication technology to enhance the coverage of Physical Uplink Shared Channel (PUSCH). In addition, it is proposed that PUSCH type A repetition is used to enhance the coverage of MSG3. The introduction of MSG3 type A repetition makes cross-slot channel estimation possible.

During reception of MSG3 repetition, under a certain condition, the network side device can perform the cross-slot channel estimation. Therefore, for the joint channel estimation, taking the gNB as an example of the network side device, both the gNB and the UE need a Time Domain Window (TDW), during which the UE is expected to maintain power consistency and phase continuity to cooperate with the gNB to perform the joint channel estimation within the TDW.

The terminal is expected to maintain power consistency and phase continuity during a process in which the gNB performs the joint channel estimation, and to maintain power consistency and phase continuity, the following relevant conditions may be met.

(1) No change on modulation level.

(2) No change on resource block (RB) allocation in terms of length and frequency position, and intra-slot and inter-slot frequency hopping cannot be enabled during a repetition process.

(3) No change on a transmission power level.

(4) No uplink (UL) beam switching of the terminal within the frequency range (FR) 2.

Therefore, if the gNB is to perform the joint channel estimation, it may instruct the terminal to maintain the above relevant conditions unchanged within the TDW of performing the joint channel estimation. Under certain conditions, a channel estimation result of the cross-slot channel estimation may be more accurate, which is beneficial for coverage enhancement/coverage recovery.

In related art, it is not defined how the network side device indicates whether to perform the joint channel estimation or the TDW required to perform the joint channel estimation to the terminal.

The disclosure proposes an indication method, for the network side device to indicate whether to perform the joint channel estimation during MSG3 repetition or not to the terminal, and indicate the TDW required to perform the joint channel estimation to the terminal.

The joint channel estimation may also be called demodulation reference signal (DMRS) bundling, or the joint channel estimation corresponds to DMRS bundling.

The length of the TDW of the joint channel estimation may also be called a duration of (nominal) TDW.

Assistance information may be used to indicate whether UE supports the duration during which the UE is able to maintain power consistency and phase continuity to support the joint channel estimation.

FIG. 2 is a flowchart of an indication method according to an embodiment. As shown in FIG. 2, the indication method is performed by a terminal, including the following steps.

In step S11, a first message is determined.

In the embodiment of the disclosure, the first message is used for the terminal to determine a configuration parameter for a network side device to perform joint channel estimation. The configuration parameter may include indication information for indicating enabling the joint channel estimation and/or a fixed parameter value or a parameter set for determining a length of a TDW of the joint channel estimation. The parameter set or the fixed parameter value for determining the TDW of the joint channel estimation determined by the terminal can be indicated by the network side device (such as a base station), or can be determined based on a communication protocol. The way of indicated by the network side includes multiple indication methods, which may refer to the following embodiments.

In some embodiments of the disclosure, the first message is used to indicate configuration information of the joint channel estimation. The configuration information includes indication information. The indication information is used to indicate to the terminal that the network side device enables the joint channel estimation. This embodiment can be implemented separately, or together with any other embodiment of the disclosure.

In some embodiments of the disclosure, the terminal receives the first message and determines that the network side device enables the joint channel estimation.

In an embodiment of the disclosure, the configuration information can be determined based on explicit signaling, such as remaining minimum system information (RMSI). The terminal receives the RSMI, determines the first message carried in the RSMI, and further determines the configuration information included in the first message. The RSMI can be scheduled based on downlink control information (DCI).

In an embodiment of the disclosure, the configuration information can also be determined based on explicit signaling which is uplink (UL) grant information in a random access response (RAR). The terminal determines whether the network side device enables the joint channel estimation or not through the first message carried in the RAR UL grant.

In an embodiment of the disclosure, the configuration information can also be determined based on explicit signaling, which is DCI with cyclic redundancy check (CRC) scrambled by a Random Access Radio Network Temporary Identifier (RA-RNTI). The terminal determines whether the network side device enables the joint channel estimation or not through the DCI with CRC scrambled by the RA-RNTI.

In an embodiment of the disclosure, the configuration information can also be determined based on explicit signaling, which is DCI with CRC scrambled by a Temporary Cell Radio Network Temporary Identifier (TC-RNTI). In other words, the terminal determines that the network side device enables the joint channel estimation based on the DCI with CRC scrambled by the TC-RNTI.

In an embodiment of the disclosure, whether the network side device enables the joint channel estimation or not may be indicated to the terminal based on an implicit indication way. For example, if the terminal is indicated to perform the MSG3 repetition, it is determined that the network side device enables the joint channel estimation.

In an embodiment of the disclosure, the above implementations of indicating that the network side device enables the joint channel estimation can also be used in joint channel estimation of a physical uplink shared channel (PUSCH) or a physical uplink control channel (PUCCH).

A way of explicit signaling indication can be used to indicate the enabling of the joint channel estimation. The explicit signaling can include Radio Resource Control (RRC) information, a System Information Block (SIB), DCI, a Media Access Control Control Element (MAC CE), etc.

In some embodiments of the disclosure, the first message is used to determine configuration information of the length of the TDW of the joint channel estimation. The configuration information includes a parameter set or a fixed parameter value for determining the length of the TDW of the joint channel estimation. This embodiment can be implemented separately, or together with any other embodiment disclosed in the present disclosure.

In an embodiment of the disclosure, the terminal may determine the first message based on a predefined rule/communication protocol, and determine a configuration parameter of the length of the TDW of the joint channel estimation in the first message. In an implementation, a parameter set for determining the length of the TDW of the joint channel estimation is determined based on the predefined rule/communication protocol. The parameter set can be a configuration specific to a cell. That is, terminals within the cell uses the parameter set of the predefined rule/communication protocol. For example, the network side device is a base station. The terminal determines a parameter in the parameter set through a parameter set index indicated by the base station, and determines the length of the TDW of the joint channel estimation based on this parameter. In an implementation, a fixed parameter value may be determined based on the predefined rule/communication protocol, and the fixed parameter value can be used to determine the length of the TDW of the joint channel estimation.

In another embodiment of the disclosure, the terminal may determine the first message based on explicit indication signaling, and further determines the parameter set or the fixed parameter value for determining the length of the TDW of the joint channel estimation included in the configuration information.

In some embodiments of the disclosure, the explicit indication signaling may be RSMI. The terminal may receive the RMSI and determine the first message carried in the RSMI. In an implementation, a configuration parameter for determining the length of the TDW of the joint channel estimation is determined based on the first message carried in the RSMI. The configuration parameter includes a parameter set for the length of the TDW of the joint channel estimation. The terminal further determines a parameter in the parameter set through a parameter set index indicated by the network side device, and determines the length of the TDW of the joint channel estimation based on this parameter. In an implementation, a fixed parameter value for indicating the length of the TDW of the joint channel estimation is determined based on the first message carried in the RSMI. This implementation may be configured for all terminals in the cell. That is, the terminals within the cell receives the RMSI, determine the first message carried in the RSMI, and determine the configuration parameter for the joint channel estimation.

In some embodiments of the disclosure, an explicit way may be DCI with CRC scrambled by a RA-RNTI. The terminal can determine the configuration parameter for the length of the TDW of the joint channel estimation based on the DCI with CRC scrambled by the RA-RNTI. In an implementation, the terminal determines, based on the DCI (such as DCI format 1-0) with CRC scrambled by the RA-RNTI, that the configuration parameter is an index of the parameter set used for determining the length of the TDW of the joint channel estimation, and further determines the length of the TDW of the joint channel estimation based on the index of the parameter set. The parameter set can be a table. The parameter set may be configured by RMSI and/or set in a protocol, and its index is further indicated by the DCI with CRC scrambled by the RA-RNTI or an uplink grant RAR. The terminal further determines a parameter in the parameter set through a parameter set index indicated by the network side device, and determines the length of the TDW of the joint channel estimation based on the parameter. The table of the parameter set can be a new table or an existing table, such as a Modulation and Coding Scheme (MCS)/TDRA table. If using an existing table, a field may be newly added in the existing table, such as adding a column. In an implementation, a fixed parameter value may be indicated by the DCI with CRC scrambled by the RA-RNTI, and the terminal determines the length of the TDW of the joint channel estimation based on the fixed parameter value. This implementation may be configured for a group of terminals.

In some embodiments of the disclosure, an explicit way may be DCI (such as DCI format 0_0) with CRC scrambled by a TC-RNTI. The terminal determines the configuration parameter of the length of the TDW of the joint channel estimation based on the DCI with CRC scrambled by the TC-RNTI. In an implementation, the configuration parameter determined based on the DCI with CRC scrambled by the TC-RNTI is an index of the parameter set for determining the length of the TDW of the joint channel estimation, and the length of the TDW of the joint channel estimation is determined based on the index of the parameter set. The parameter set can be a table configured by RMSI, and/or the parameter set may be set in the protocol, and the index of the parameter set may be indicated by the DCI with CRC scrambled by the TC-RNTI. The terminal further determines a parameter in the parameter set through a parameter set index indicated by the network side device. Based on the parameter, the length of the TDW of the joint channel estimation is determined. For example, the parameter set includes multiple parameters, such as [2, 4, 8], and a parameter for determining the length of the TDW of the joint channel estimation is determined in the parameter set based on the indicated parameter set index. The table of the parameter set can be a new table or an existing table, such as the Modulation and Coding Scheme (MCS)/TDRA table. If an existing table is used, a field may be newly added in the existing table, such as adding a column. In an implementation, a fixed parameter value can also be indicated based on the DCI with CRC scrambled by the TC-RNTI. The terminal determines the length of the TDW of the joint channel estimation based on the fixed parameter value. This implementation can be specific to a specific terminal.

In some embodiments of the disclosure, an explicit way may be RAR UL grant. The terminal determines a configuration parameter for determining the length of the TDW of the joint channel estimation based on the RAR UL grant. In an implementation, the configuration parameter determined based on the RAR UL grant is an index of the parameter set for determining the length of the TDW of the joint channel estimation, and the length of the TDW of the joint channel estimation is determined based on the index of the parameter set. The parameter set for determining the length of the TDW of the joint channel estimation can be a table, configured by RMSI and/or set in a protocol, and its index is indicated by the RAR UL grant. The terminal determines a parameter in the parameter set through a parameter set index indicated by the network side device, and determines the length of the TDW of the joint channel estimation based on this parameter. For example, the parameter set includes multiple parameters, such as [2, 4, 8], and a parameter for determining the length of the TDW of the joint channel estimation is determined in the parameter set based on the indicated parameter set index. A table of the parameter set can be a new table or an existing table, such as the Modulation and Coding Scheme (MCS)/TDRA table. If an existing table is used, a field may be newly added in the existing table, such as adding a column. In an implementation, a fixed parameter value can also be indicated based on the RAR UL grant. The terminal determines the length of the TDW of the joint channel estimation based on the fixed parameter value. This implementation can be specific to a specific terminal.

In some embodiments of the disclosure, an implicit way may be used to indicate the parameter of the length of the TDW of the joint channel estimation. For example, the parameter of the length of the TDW of the joint channel estimation may be implicitly determined based on a number of repetitions. For example, the length of the TDW of the joint channel estimation is a number of time slots corresponding to the number of repetitions /N. N is a positive integer, for example, N is 2. Certainly, this is only an example, and is not a specific limitation to the disclosure.

In some embodiments of the disclosure, the first message is used to indicate the configuration information of the joint channel estimation. The configuration information includes a parameter set or a fixed parameter value for indicating the terminal about the length of the TDW of the joint channel estimation and that the network side device enables the joint channel estimation. This embodiment can be implemented separately, or together with any other embodiment of the disclosure.

In an embodiment of the disclosure, the terminal determines the first message based on the RMSI indication provided by the network side device. The first message is a fixed value, and the terminal determines whether the joint channel estimation is enabled or disabled on the network side based on the fixed value. At the same time, the window length of the joint channel estimation may be determined based on the fixed value. For example, if the RMSI carries the fixed value, the terminal determines that the joint channel estimation is enabled on the network side. Furthermore, the terminal determines the length of the TDW of the joint channel estimation based on the fixed value. If the fixed value is not carried in the RMSI, the terminal determines that the joint channel estimation is disabled on the network side. For example, if the RMSI carries a fixed value and the fixed value is 0 or 1, the terminal determines that the joint channel estimation is disabled on the network side. If the RMSI carries a fixed value and the fixed value is greater than 1, the terminal determines that the joint channel estimation is enabled on the network side, and the terminal further determines the length of the TDW of the joint channel estimation based on the fixed value.

In another embodiment of the disclosure, the configuration information indicating the joint channel estimation can be determined based on the DCI (such as DCI format 1-0) with CRC scrambled by the RA-RNTI. In an implementation, the configuration information includes a fixed value for determining whether the joint channel estimation is enabled or disabled. If the fixed value is 0 or 1, it is determined that the joint channel estimation is disabled. If the fixed value is a value other than 1 or 0, it is determined that the joint channel estimation is enabled, and the length of the TDW of the joint channel estimation is determined based on the fixed value. In another implementation, the configuration information includes a parameter set for the length of the TDW of the joint channel estimation. The parameter set is specified by a RMSI configuration or a protocol, and its parameter set index is further indicated by the DCI with CRC scrambled by the RA-RNTI. The terminal determines a parameter in the parameter set based on the parameter set index indicated by the network side device, and determines whether to enable the joint channel estimation and the length of the TDW of the joint channel estimation based on this parameter. The parameter set can be a table, which can be a new table or an existing table, such as the Modulation and Coding Scheme (MCS)/TDRA table. If an existing table is used, a field may be newly added in the existing table, such as adding a column. For example, parameters included in the parameter set may be [0, 2, 4, 8]. The parameter 0 indicates that the joint channel estimation is disabled. If the parameter is any of the parameters other than 0, it is determined that the joint channel estimation is enabled, and the parameter is determined as the length of the TDW of the joint channel estimation. Certainly, the parameter 0 can also be parameter 1. When parameter 1 is indicated, it is determined not to enable the joint channel estimation, which is not limited herein. This implementation may be configured for a group of terminals.

In another embodiment of the disclosure, the configuration information indicating the joint channel estimation can be determined based on DCI (such as DCI format 0_0) with CRC scrambled by the TC-RNTI. In an implementation, configuration information includes a fixed value for determining whether the joint channel estimation is enabled or disabled. If the fixed value is 0 or 1, it is determined that the joint channel estimation is disabled. If the fixed value is a value other than 1 or 0, it is determined that the joint channel estimation is enabled, and the fixed value is determined as the length of the TDW of the joint channel estimation. In another implementation, the configuration information includes a parameter set for the length of the TDW of the joint channel estimation. The parameter set is specified by a RMSI configuration or a protocol, and its parameter set index is further indicated by the DCI with CRC scrambled by the RA-RNTI. The terminal determines a parameter in the parameter set based on a parameter set index indicated by the network side device, and determines whether to enable the joint channel estimation and the length of the TDW of the joint channel estimation based on the parameter. The parameter set can be a table, which can be a new table or an existing table, such as the Modulation and Coding Scheme (MCS)/TDRA table. If an existing table is used, a field may be newly added in the existing table, such as adding a column. For example, parameters included in the parameter set are [0, 2, 4, 8]. The parameter 0 indicates that the joint channel estimation is disabled. If the parameter is any of the parameters other than 0, it is determined that the joint channel estimation is enabled, and the length of the TDW of the joint channel estimation is determined based on this parameter. Certainly, the parameter 0 can also be parameter 1. When parameter 1 is indicated, it is determined not to enable the joint channel estimation, which is not limited herein.

In another embodiment of the disclosure, the configuration information indicating the joint channel estimation can be determined based on DCI (such as DCI format 0_0) with CRC scrambled by the TC-RNTI. In an implementation, the configuration information includes a fixed value for determining whether the joint channel estimation is enabled or disabled. If the fixed value is 0 or 1, it is determined that the joint channel estimation is disabled. If the fixed value is a value other than 1 or 0, it is determined that the joint channel estimation is enabled, and the fixed value is determined as the length of the TDW of the joint channel estimation. In another implementation, the configuration information includes a parameter set for the length of the TDW of the joint channel estimation. The parameter set is specified by a RMSI configuration or a protocol, and its parameter set index is further indicated by the DCI with CRC scrambled by the RA-RNTI. The terminal determines a parameter in the parameter set based on a parameter set index indicated by the network side device, and determines whether to enable the joint channel estimation and the length of the TDW of the joint channel estimation based on this parameter. The parameter set can be a table, which can be a new table or an existing table, such as the Modulation and Coding Scheme (MCS)/TDRA table. If an existing table is used, a field may be newly added in the existing table, such as adding a column. For example, parameters included in the parameter set are [0, 2, 4, 8]. The parameter 0 indicates that the joint channel estimation is disabled. If the parameter is any of the parameters other than 0, it is determined that the joint channel estimation is enabled, and the length of the TDW of the joint channel estimation is determined based on this parameter. Certainly, the parameter 0 can also be parameter 1. When parameter 1 is indicated, it is determined not to enable the joint channel estimation, which is not limited herein.

In an embodiment of the disclosure, as described above, the network side device determines a parameter set or a fixed parameter value of the length of the TDW of the joint channel estimation. Each parameter in the parameter set or the fixed parameter value can be determined based on the number of MSG3 repetitions of the terminal. For example, each parameter in the parameter set or the fixed parameter value is determined to be a common factor of all optional numbers of repetitions. For example, if the optional numbers of repetitions are 4 and 8. It can be determined that parameters in the parameter set are 2 and 4. Or, the fixed parameter value configured is determined to be 4. Certainly, this is only an example, and not a specific limitation of this disclosure.

With the indication method provided in the embodiments of the disclosure, the terminal may be indicated about the TDW for performing the joint channel estimation and that the network side devices enables the joint channel estimation, solving the problem of being unable to indicate to the terminal about the TDW for performing the joint channel estimation and that the joint channel estimation is enabled.

In an embodiment of the disclosure, the terminal determines that the joint channel estimation is enabled based on the received configuration information, and obtains the parameter for the length of the TDW of the joint channel estimation. Performing the joint channel estimation based on the obtained parameter may use the following implementations.

FIG. 3 is a flowchart of an indication method according to an embodiment. As shown in FIG. 3, the indication method is performed by a terminal. This embodiment can be implemented separately, or together with any other embodiment of the disclosure. The method includes the following steps.

At step S21, based on the configuration parameter, a first parameter is determined in the parameter set, or the fixed parameter value is determined as the first parameter.

At step S22, the length of the TDW for performing joint channel estimation is determined based on the first parameter.

In an embodiment of the disclosure, as described above, the configuration parameter is determined, the first parameter is determined in the parameter set, or the fixed parameter value is determined as the first parameter. The length of the TDW for performing the joint channel estimation is determined based on the first parameter. For the convenience of description, a parameter indicated based on the configuration information in the parameter set is referred to as the first parameter.

FIG. 4 is a flowchart of an indication method illustrated according to an embodiment. As shown in FIG. 4, the indication method is performed by a terminal. This embodiment can be implemented separately or together with any other embodiment of the disclosure. The method includes the following steps.

At step S31, the first parameter is determined as the length of the TDW for performing joint channel estimation.

In an exemplary embodiment of the present disclosure, a parameter set for determining the length of the TDW of the joint channel estimation is obtained in the configuration parameter, and one parameter in the parameter set indicated by the base station is determined as the length of the TDW of the joint channel estimation. Or, a fixed parameter value for determining the length of the TDW of the joint channel estimation is obtained in the configuration parameter, and the parameter value is determined as the length of the TDW for performing the joint channel estimation. For example, the parameter set for determining the length of the TDW of the joint channel estimation includes multiple parameters, such as 2, 4, and 8, respectively. If the parameter indicating the length of the TDW of the joint channel estimation is 4, a duration for performing the joint channel estimation is determined to be 4. The duration can be time slots, that is, the length of the TDW of the joint channel estimation is 4 consecutive time slots. In other words, the network side device performs the joint channel estimation every 4 time slots/repetitions. Here, the duration can also be other scheduling time units, which is not limited herein.

In an embodiment of the disclosure, the first parameter is determined as the TDW for performing the joint channel estimation. In the case where a transmission time period of the number of repetitions is less than the length of the TDW of the joint channel estimation, the joint channel estimation can be performed based on different strategies, which may refer to the following embodiments.

FIG. 5 is a flowchart of an indication method according to an embodiment. As shown in FIG. 5, the indication method is performed by a terminal. This embodiment can be implemented separately or together with any other embodiment of the disclosure. The method includes the following steps.

At step S41, a transmission time period corresponding to the number of repetitions is determined, and the joint channel estimation is performed based on a first strategy in response to the transmission time period being less than the first parameter.

In an embodiment of the disclosure, the terminal determines the transmission time period corresponding to the number of repetitions. For example, a message being repeatedly transmitted is MSG3, and the number of MSG3 repetitions is 2. If the determined first parameter is 4, the transmission time period corresponding to the number of repetitions is less than the first parameter. It is determined to perform the joint channel estimation based on the first strategy.

In some embodiments of the disclosure, performing the joint channel estimation based on the first strategy includes canceling the joint channel estimation. That is, in the case where the transmission time period is less than the first parameter, it is determined to cancel enabling the joint channel estimation.

In some embodiments of the disclosure, performing the joint channel estimation based on the first strategy also includes re-determining the length of the TDW of the joint channel estimation based on a predefined rule, and performing the joint channel estimation based on the re-determined length of the TDW.

For example, the transmission time period of the number of repetitions or half of the transmission time period may be re-determined as an actual length of the TDW of the joint channel estimation based on the predefined rule. The transmission time period of the number of repetitions may also be determined as the length of the TDW for performing the joint channel estimation. A fixed value indicated by a communication protocol may be determined as the length of the TDW for performing the joint channel estimation. A value specified by the network side device may also be determined as the length of the TDW for performing the joint channel estimation based on the configuration parameter. A value close to the specified value and less than the transmission time period corresponding to the number of repetitions may also be determined as the TDW for performing the joint channel estimation.

In some embodiments of the disclosure, performing the joint channel estimation based on the first strategy includes re-determining the length of the TDW of the joint channel estimation based on the transmission time period of the number of repetitions. For example, a duration of the joint channel estimation is specified as a common factor of all optional numbers of repetitions, and the TDW for performing the joint channel estimation is determined based on the common factor.

FIG. 6 is a flowchart of an indication method according to an embodiment. As shown in FIG. 6, the indication method is performed by a terminal, and this embodiment can be implemented separately or together with any other embodiment of the disclosure. The method includes the following steps.

At step S51, a transmission time period corresponding to a number of blind retransmissions is determined, and the joint channel estimation is performed based on a second strategy in response to a result of a quotient operation on the transmission time period and the first parameter including a quotient value and a remainder.

In an embodiment of the disclosure, the transmission time period corresponding to the number of blind retransmissions is determined. If a remaining transmission time period remained after performing the joint channel estimation based on the transmission time period is less than a length of a TDW for performing a next joint channel estimation, it is determined that the second strategy is used to perform the joint channel estimation.

In some embodiments of the disclosure, performing the joint channel estimation based on the second strategy includes canceling the joint channel estimation. That is, in the case where the remaining transmission time period remained after performing the joint channel estimation based on the transmission time period is less than the length of the TDW for performing the next joint channel estimation, it is determined to cancel enabling the joint channel estimation.

In some embodiments of the disclosure, performing the joint channel estimation based on the second strategy includes canceling joint channel estimation in time slots within the remainder of the result of the quotient operation on the transmission time period and the first parameter. In other words, if a transmission time period remained after performing the joint channel estimation based on the transmission time period is smaller than the length of the TDW of the next joint channel estimation, joint channel estimation within the transmission time period remained is canceled.

In some embodiments of the disclosure, performing the joint channel estimation based on the second strategy includes: re-determining the length of the TDW of the joint channel estimation based on a predefined rule, and performing the joint channel estimation based on the re-determined length of the TDW of the joint channel estimation. Further, the terminal determines the lengths of TDWs of joint channel estimation for all repetitions based on the predefined rule. The terminal can re-divide the length of the TDW of the joint channel estimation based on the transmission time period corresponding to the number of repetitions.

In some embodiments of the disclosure, performing the joint channel estimation based on the second strategy includes: re-determining a time period corresponding to the remainder of the result of the quotient operation on the transmission time period and the first parameter based on the predefined rule as the length of the TDW of the joint channel estimation. The terminal performs the joint channel estimation based on the re-determined length of the TDW. The terminal determines the remainder of the result of the quotient operation on the transmission time period and a first duration based on the predefined rule. That is, the remaining transmission time period remained after performing the joint channel estimation is determined. For the remaining transmission time period, a duration of performing a next joint channel estimation may be determined to be consistent with the remaining transmission time period. For example, the repetitions are 14 time slots, the first parameter is 4 time slots, thus, the remainder is 2, and the length of the TDW for performing the last joint channel estimation is determined to be 2.

In some embodiments of the disclosure, performing the joint channel estimation based on the second strategy includes re-determining the length of the TDW for performing the joint channel estimation based on the number of repetitions and the length of the TDW of the joint channel estimation. For example, based on each optional number of repetitions, division is performed to determine an optional length of the TDW of the joint channel estimation time window. The division operation is dividing the transmission time period corresponding to an optional number of repetitions by a predefined parameter value. For example, the predefined parameter value is 4, the transmission time period corresponding to the optional number of repetitions is 12, and its time unit can be a time slot. Then a duration of performing the joint channel estimation is determined to be 3. In other words, the length of the TDW for performing the joint channel estimation.

FIG. 7 is a flowchart of an indication method according to an embodiment. As shown in FIG. 7, the indication method is performed by a terminal, and this embodiment can be implemented separately or together with any other embodiment of the disclosure. The method includes the following steps.

At step S61, a transmission time period corresponding to a number of repetitions is determined, a second parameter is obtained by performing calculation on the transmission time period based on a predefined operation rule, and the second parameter is determined as a length of a TDW for performing joint channel estimation.

In an exemplary embodiment of the disclosure, the transmission time period corresponding to the repetitions is determined in the configuration parameter. Further, the calculation is performed on the transmission time period based on the predefined operation rule, and an obtained operational value (a relative value) is determined as the second parameter. The second parameter is determined as the length of the TDW for performing the joint channel estimation.

FIG. 8 is a flowchart of an indication method according to an embodiment. As shown in FIG. 8, the indication method is performed by a terminal, and this embodiment can be implemented separately or together with any other embodiment of the disclosure. The method includes the following steps.

At step S71, a transmission time period corresponding to a number of repetitions is determined, and a quotient value obtained by dividing the transmission time period by a predefined parameter value is determined as the second parameter.

In an embodiment of the disclosure, a quotient operation may be performed on the transmission time period based on the predefined parameter value. For example, the predefined parameter value is 4, the determined transmission time period corresponding to the number of repetitions is 12, and its time unit can be a time slot. Then a duration of performing the joint channel estimation is determined to be 3. In other words, a network side device can repeatedly perform a joint channel estimation every 3 time slots.

In some embodiments of the disclosure, if a relative value of the number of repetitions is determined as the duration of performing the joint channel estimation, there may be a situation where the second parameter is less than a first value and a situation where the second parameter has a corresponding remainder after the quotient operation is performed.

FIG. 9 is a flowchart of an indication method according to an embodiment. As shown in FIG. 9, the indication method is performed by a terminal, and this embodiment can be implemented separately or together with any other embodiment of the disclosure. The method includes the following steps.

At step S81, in response to the second parameter being less than the first value, the joint channel estimation is performed based on a third strategy.

In an embodiment of the disclosure, for the case where the second parameter is less than the first value, the joint channel estimation may be performed based on the third strategy. The first value may be 1. For example, the transmission time period corresponding to the repetitions is 2, and a duration of performing the joint channel estimation indicated by the network side device is 4, where the time can be a time slot. Thus, a second duration is 2/4, the network side device is unable to perform the joint channel estimation.

In some embodiments of the disclosure, performing the joint channel estimation based on the third strategy includes canceling the joint channel estimation. That is, in the case where the second parameter is less than the first value, it is determined to cancel enabling the joint channel estimation.

In some embodiments of the disclosure, performing the joint channel estimation based on the third strategy includes re-determining the second parameter based on a predefined rule. For example, in MSG3 repetition, a duration of performing the joint channel estimation is re-determined. For example, it can be a half of a duration granularity, or a fixed value that is determined to be less than the transmission time period corresponding to the repetitions.

In some embodiments of the disclosure, performing the joint channel estimation based on the third strategy includes re-determining the length of the TDW for performing the joint channel estimation based on the transmission time period corresponding to the repetitions.

FIG. 10 is a flowchart of an indication method according to an embodiment. As shown in FIG. 10, the indication method is performed by a terminal, and this embodiment can be implemented separately or together with any other embodiment of the disclosure. The method includes the following steps.

At step S91, in response to the second parameter having a corresponding remainder, the joint channel estimation is performed based on a fourth strategy.

In an embodiment of the disclosure, the fourth strategy may be performed in the case where there is a remainder after the quotient operation is performed for the second parameter. For example, the transmission time period of the repetitions is 14 and a relative value of the repetitions is 4, then there is a remainder for operation 14/4, where the time can be a time slot.

In some embodiments of the disclosure, performing the joint channel estimation based on the fourth strategy includes determining a lower bound of a time granularity for performing the joint channel estimation. For example, a duration may be selected as 3 time slots. In other words, the network side device can perform the joint channel estimation for 5 times during actual performing the joint channel estimation, in which, a duration of each of the first 4 joint channel estimations is 3 time slots, and a duration of the last joint channel estimation is 2 time slots. Or, the network side device can perform the joint channel estimation four times, and no joint channel estimation is performed in the remaining 2 time slots.

In some embodiments of the disclosure, performing the joint channel estimation based on the fourth strategy includes determining an integer multiple of the quotient value of the second duration. That is, an integer value of the quotient operation is determined as the length of the TDW for performing the joint channel estimation.

In some embodiments of the present disclosure, performing the joint channel estimation based on the fourth strategy includes re-determining the second duration based on a predefined rule. In other words, a fixed value is redefined based on the predefined rule, by using the fixed value as a benchmark, a relative value by which the transmission time period of the repetitions can be evenly divided is determined as the length of the TDW for performing the joint channel estimation. The relative value can be determined by the protocol or indicated by the network side, and the relative value is less than or greater than the fixed value.

In some embodiments of the disclosure, performing the joint channel estimation based on the fourth strategy includes re-determining the length of the TDW for performing the joint channel estimation based on the transmission time period of the repetitions and the duration granularity of the joint channel estimation.

In some embodiments of the disclosure, performing the joint channel estimation based on the fourth strategy includes canceling the joint channel estimation. That is, in the case that there is a remainder in the result of the quotient operation, it is determined to cancel enabling joint channel estimation.

FIG. 11 is a flowchart of an indication method according to an embodiment. As shown in FIG. 11, the indication method is performed by a terminal, and this embodiment can be implemented separately or together with any other embodiment of the disclosure. The method includes the following steps.

At step S101, assistance information is reported.

In an embodiment of the disclosure, the assistance information is used for a network side device to determine a configuration parameter for performing joint channel estimation. The assistance information may be speed information, etc. Different speed information represents different channel state change information. It can assist the network side in making a decision on whether to enable the joint channel estimation based on the channel state change information reported by the terminal, and in making a decision on a length of a TDW for performing the joint channel estimation.

FIG. 12 is a flowchart of an indication method according to an embodiment. As shown in FIG. 12, the indication method is performed by a terminal, and this embodiment can be implemented separately or together with any other embodiment of the disclosure. The method includes the following steps.

At step S111, based on random access MSG1, assistance information is reported.

In an embodiment of the disclosure, different speed information may be determined based on different physical random access channel (PRACH) resource groups in MSG1. The PRACH resources can be time frequency resources, frequency domain resources, code domain resources, etc. The terminal can send a preamble based on a group corresponding to its own speed to inform a current channel situation of the terminal.

FIG. 13 is a flowchart of an indication method according to an embodiment. As shown in FIG. 13, the indication method is performed by a terminal, and this embodiment can be implemented separately or together with any other embodiment of the disclosure. The method includes the following steps.

At step S121, assistance information is reported based on a demodulation reference signal (DMRS).

In an embodiment of the disclosure, different speed information is reported based on different DMRSs to inform a channel condition of the terminal to a network side device. The DMRS can be a time domain position, a frequency domain position, a code domain position, etc. It should be noted that, when using the DMRS to report the speed information, joint channel estimation is not performed during the initial transmission process. Or, a configuration parameter of the joint channel estimation indicated by a base station is used for the initial transmission of MSG3. In an embodiment of the disclosure, when the assistance information is used for retransmission, it assists the network side device in making a decision on enabling the joint channel estimation.

FIG. 14 is a flowchart of an indication method according to an embodiment. As shown in FIG. 14, the indication method is performed by a terminal, and this embodiment can be implemented separately or together with any other embodiment of the disclosure. The method includes the following steps.

At step S131, in response to a network side device scheduling the terminal to perform MSG3 repetition, a second message is received.

In an embodiment of the disclosure, the second message is used to indicate a configuration parameter for the network side device to perform joint channel estimation during a repetition process of the terminal.

In some embodiments of the disclosure, the second message may be the same as the first message, i.e., following the same configuration parameter as the initial transmission, or the same indication mechanism for performing the joint channel estimation. For example, a value of a length of a TDW indicated based on the first message may be applied to both the initial transmission and retransmissions.

In some embodiments of the disclosure, the second message is partially the same as the first message. That is, when the terminal performs MSG3 repetition, partial configuration parameters, or partial indication mechanisms for performing the joint channel estimation of the initial transmission are used. For example, a length of a TDW for performing the joint channel estimation in the initial transmission may be explicitly indicated, and a TDW for the repetitions may be implicitly indicated. The length of the TDW for performing the joint channel estimation for the initial transmission and the TDW for the repetitions may be activated using the same message.

In some embodiments of the disclosure, the second message may be completely different from the first message.

In an embodiment of the disclosure, it should be noted that the joint channel estimation can also be referred to as cross-slot channel estimation.

Based on the same/similar concept, the embodiments of the disclosure also provide an indication method.

FIG. 15 is a flowchart of an indication method according to an embodiment. As shown in FIG. 15, the indication method is performed by a network device, including the following steps.

In step S141, a first message is determined.

In the embodiment of the disclosure, the first message is used for the terminal to determine a configuration parameter for the network side device to perform joint channel estimation. The configuration parameter may include indication information for indicating enabling the joint channel estimation and/or a fixed parameter value or a parameter set for determining a length of the TDW of the joint channel estimation. The parameter set or the fixed parameter value for determining the TDW of the joint channel estimation determined by the terminal can be indicated by the network side device (such as a base station), or can be determined based on a communication protocol. The way of indicated by the network side includes multiple indication methods, which may refer to the following embodiments.

In some embodiments of the disclosure, the first message is used to indicate configuration information of the joint channel estimation. The configuration information includes indication information. The indication information is used to indicate to the terminal that the network side device enables the joint channel estimation. This embodiment can be implemented separately, or together with any other embodiment of the disclosure.

In some embodiments of the disclosure, the terminal receives the first message and determines that the network side device enables the joint channel estimation.

In an embodiment of the disclosure, the configuration information can be determined based on explicit signaling, such as remaining minimum system information (RMSI). The terminal receives the RSMI, determines the first message carried in the RSMI, and further determines the configuration information included in the first message. The RSMI can be scheduled based on downlink control information (DCI).

In an embodiment of the disclosure, the configuration information can also be determined based on explicit signaling which is uplink (UL) grant information in a random access response (RAR). The terminal determines whether the network side device enables the joint channel or not estimation through the first message carried in the RAR UL grant.

In an embodiment of the disclosure, the configuration information can also be determined based on explicit signaling, which is DCI with cyclic redundancy check (CRC) scrambled by a Random Access Radio Network Temporary Identifier (RA-RNTI). The terminal determines whether the network side device enables the joint channel estimation or not through the DCI with CRC scrambled by the RA-RNTI.

In an embodiment of the disclosure, the configuration information can also be determined based on explicit signaling, which is DCI with CRC scrambled by a Temporary Cell Radio Network Temporary Identifier (TC-RNTI). In other words, the terminal determines that the network side device enables the joint channel estimation based on the DCI with CRC scrambled by the TC-RNTI.

In an embodiment of the disclosure, whether the network side device enables the joint channel estimation or not may be indicated to the terminal based on an implicit indication way. For example, if the terminal is indicated to perform the MSG3 repetition, it is determined that the network side device enables the joint channel estimation.

In an embodiment of the disclosure, the above implementations of indicating that the network side device enables the joint channel estimation can also be used in joint channel estimation of a physical uplink shared channel (PUSCH) or a physical uplink control channel (PUCCH).

A way of explicit signaling indication can be used to indicate the enabling of the joint channel estimation. The explicit signaling can include Radio Resource Control (RRC) information, a System Information Block (SIB), DCI, a Media Access Control Control Element (MAC CE), etc.

In some embodiments of the disclosure, the first message is used to determine configuration information of the length of the TDW of the joint channel estimation. The configuration information includes a parameter set or a fixed parameter value for determining the length of the TDW of the joint channel estimation. This embodiment can be implemented separately, or together with any other embodiment disclosed in the present disclosure.

In an embodiment of the disclosure, the terminal may determine the first message based on a predefined rule/communication protocol, and determine a configuration parameter of the length of the TDW of the joint channel estimation in the first message. In an implementation, a parameter set for determining the length of the TDW of the joint channel estimation is determined based on the predefined rule/communication protocol. The parameter set can be a configuration specific to a cell. That is, terminals within the cell uses the parameter set of the predefined rule/communication protocol. For example, the network side device is a base station. The terminal determines a parameter in the parameter set through a parameter set index indicated by the base station, and determines the length of the TDW of the joint channel estimation based on this parameter. In an implementation, a fixed parameter value may be determined based on the predefined rule/communication protocol, and the fixed parameter value can be used to determine the length of the TDW of the joint channel estimation.

In another embodiment of the disclosure, the terminal may determine the first message based on explicit indication signaling, and further determines the parameter set or the fixed parameter value for determining the length of the TDW of the joint channel estimation included in the configuration information.

In some embodiments of the disclosure, the explicit indication signaling may be RSMI. The terminal may receive the RMSI and determine the first message carried in the RSMI. In an implementation, a configuration parameter for determining the length of the TDW of the joint channel estimation is determined based on the first message carried in the RSMI. The configuration parameter includes a parameter set for the length of the TDW of the joint channel estimation. The terminal further determines a parameter in the parameter set through a parameter set index indicated by the network side device, and determines the length of the TDW of the joint channel estimation based on this parameter. In an implementation, a fixed parameter value for indicating the length of the TDW of the joint channel estimation is determined based on the first message carried in the RSMI. This implementation may be configured for all terminals in the cell. That is, the terminals within the cell receives the RMSI, determine the first message carried in the RSMI, and determine the configuration parameter for the joint channel estimation.

In some embodiments of the disclosure, an explicit way may be DCI with CRC scrambled by a RA-RNTI. The terminal can determine the configuration parameter for the length of the TDW of the joint channel estimation based on the DCI with CRC scrambled by the RA-RNTI. In an implementation, the terminal determines, based on the DCI (such as DCI format 1-0) with CRC scrambled by the RA-RNTI, that the configuration parameter is an index of the parameter set used for determining the length of the TDW of the joint channel estimation, and further determines the length of the TDW of the joint channel estimation based on the index of the parameter set. The parameter set can be a table. The parameter set may be configured by RMSI and/or set in a protocol, and its index is further indicated by the DCI with CRC scrambled by the RA-RNTI or an uplink grant RAR. The terminal further determines a parameter in the parameter set through a parameter set index indicated by the network side device, and determines the length of the TDW of the joint channel estimation based on the parameter. The table of the parameter set can be a new table or an existing table, such as a Modulation and Coding Scheme (MCS)/TDRA table. If using an existing table, a field may be newly added in the existing table, such as adding a column. In an implementation, a fixed parameter value may be indicated by the DCI with CRC scrambled by the RA-RNTI, and the terminal determines the length of the TDW of the joint channel estimation based on the fixed parameter value. This implementation may be configured for a group of terminals.

In some embodiments of the disclosure, an explicit way may be DCI (such as DCI format 0_0) with CRC scrambled by a TC-RNTI. The terminal determines the configuration parameter of the length of the TDW of the joint channel estimation based on the DCI with CRC scrambled by the TC-RNTI. In an implementation, the configuration parameter determined based on the DCI with CRC scrambled by the TC-RNTI is an index of the parameter set for determining the length of the TDW of the joint channel estimation, and the length of the TDW of the joint channel estimation is determined based on the index of the parameter set. The parameter set can be a table configured by RMSI, and/or the parameter set may be set in the protocol, and the index of the parameter set may be indicated by the DCI with CRC scrambled by the TC-RNTI. The terminal further determines a parameter in the parameter set through a parameter set index indicated by the network side device. Based on the parameter, the length of the TDW of the joint channel estimation is determined. For example, the parameter set includes multiple parameters, such as [2, 4, 8], and a parameter for determining the length of the TDW of the joint channel estimation is determined in the parameter set based on the indicated parameter set index. The table of the parameter set can be a new table or an existing table, such as the Modulation and Coding Scheme (MCS)/TDRA table. If an existing table is used, a field may be newly added in the existing table, such as adding a column. In an implementation, a fixed parameter value can also be indicated based on the DCI with CRC scrambled by the TC-RNTI. The terminal determines the length of the TDW of the joint channel estimation based on the fixed parameter value. This implementation can be specific to a specific terminal.

In some embodiments of the disclosure, an explicit way may be RAR UL grant. The terminal determines a configuration parameter for determining the length of the TDW of the joint channel estimation based on the RAR UL grant. In an implementation, the configuration parameter determined based on the RAR UL grant is an index of the parameter set for determining the length of the TDW of the joint channel estimation, and the length of the TDW of the joint channel estimation is determined based on the index of the parameter set. The parameter set for determining the length of the TDW of the joint channel estimation can be a table, configured by RMSI and/or set in a protocol, and its index is indicated by the RAR UL grant. The terminal determines a parameter in the parameter set through a parameter set index indicated by the network side device, and determines the length of the TDW of the joint channel estimation based on this parameter. For example, the parameter set includes multiple parameters, such as [2, 4, 8], and a parameter for determining the length of the TDW of the joint channel estimation is determined in the parameter set based on the indicated parameter set index. A table of the parameter set can be a new table or an existing table, such as the Modulation and Coding Scheme (MCS)/TDRA table. If an existing table is used, a field may be newly added in the existing table, such as adding a column. In an implementation, a fixed parameter value can also be indicated based on the RAR UL grant. The terminal determines the length of the TDW of the joint channel estimation based on the fixed parameter value. This implementation can be specific to a specific terminal.

In some embodiments of the disclosure, an implicit way may be used to indicate the parameter of the length of the TDW of the joint channel estimation. For example, the parameter of the length of the TDW of the joint channel estimation may be implicitly determined based on a number of repetitions. For example, the length of the TDW of the joint channel estimation is a number of time slots corresponding to the number of repetitions/N. N is a positive integer, for example, N is 2. Certainly, this is only an example, and is not a specific limitation to the disclosure.

In some embodiments of the disclosure, the first message is used to indicate the configuration information of the joint channel estimation. The configuration information includes a parameter set or a fixed parameter value for indicating the terminal about the length of the TDW of the joint channel estimation and that the network side device enables the joint channel estimation. This embodiment can be implemented separately, or together with any other embodiment of the disclosure.

In an embodiment of the disclosure, the terminal determines the first message based on the RMSI indication provided by the network side device. The first message is a fixed value, and the terminal determines whether the joint channel estimation is enabled or disabled on the network side based on the fixed value. At the same time, the window length of the joint channel estimation may be determined based on the fixed value. For example, if the RMSI carries the fixed value, the terminal determines that the joint channel estimation is enabled on the network side. Furthermore, the terminal determines the length of the TDW of the joint channel estimation based on the fixed value. If the fixed value is not carried in the RMSI, the terminal determines that the joint channel estimation is disabled on the network side. For example, if the RMSI carries a fixed value and the fixed value is 0 or 1, the terminal determines that the joint channel estimation is disabled on the network side. If the RMSI carries a fixed value and the fixed value is greater than 1, the terminal determines that the joint channel estimation is enabled on the network side, and the terminal further determines the length of the TDW of the joint channel estimation based on the fixed value.

In another embodiment of the disclosure, the configuration information indicating the joint channel estimation can be determined based on the DCI (such as DCI format 1-0) with CRC scrambled by the RA-RNTI. In an implementation, the configuration information includes a fixed value for determining whether the joint channel estimation is enabled or disabled. If the fixed value is 0 or 1, it is determined that the joint channel estimation is disabled. If the fixed value is a value other than 1 or 0, it is determined that the joint channel estimation is enabled, and the length of the TDW of the joint channel estimation is determined based on the fixed value. In another implementation, the configuration information includes a parameter set for the length of the TDW of the joint channel estimation. The parameter set is specified by a RMSI configuration or a protocol, and its parameter set index is further indicated by the DCI with CRC scrambled by the RA-RNTI. The terminal determines a parameter in the parameter set based on the parameter set index indicated by the network side device, and determines whether to enable the joint channel estimation and the length of the TDW of the joint channel estimation based on this parameter. The parameter set can be a table, which can be a new table or an existing table, such as the Modulation and Coding Scheme (MCS)/TDRA table. If an existing table is used, a field may be newly added in the existing table, such as adding a column. For example, parameters included in the parameter set may be [0, 2, 4, 8]. The parameter 0 indicates that the joint channel estimation is disabled. If the parameter is any of the parameters other than 0, it is determined that the joint channel estimation is enabled, and the parameter is determined as the length of the TDW of the joint channel estimation. Certainly, the parameter 0 can also be parameter 1. When parameter 1 is indicated, it is determined not to enable the joint channel estimation, which is not limited herein. This implementation may be configured for a group of terminals.

In another embodiment of the disclosure, the configuration information indicating the joint channel estimation can be determined based on DCI (such as DCI format 0_0) with CRC scrambled by the TC-RNTI. In an implementation, the configuration information includes a fixed value for determining whether the joint channel estimation is enabled or disabled. If the fixed value is 0 or 1, it is determined that the joint channel estimation is disabled. If the fixed value is a value other than 1 or 0, it is determined that the joint channel estimation is enabled, and the fixed value is determined as the length of the TDW of the joint channel estimation. In another implementation, the configuration information includes a parameter set for the length of the TDW of the joint channel estimation. The parameter set is specified by a RMSI configuration or a protocol, and its parameter set index is further indicated by the DCI with CRC scrambled by the RA-RNTI. The terminal determines a parameter in the parameter set based on a parameter set index indicated by the network side device, and determines whether to enable the joint channel estimation and the length of the TDW of the joint channel estimation based on the parameter.

The parameter set can be a table, which can be a new table or an existing table, such as the Modulation and Coding Scheme (MCS)/TDRA table. If an existing table is used, a field may be newly added in the existing table, such as adding a column. For example, parameters included in the parameter set are [0, 2, 4, 8]. The parameter 0 indicates that the joint channel estimation is disabled. If the parameter is any of the parameters other than 0, it is determined that the joint channel estimation is enabled, and the length of the TDW of the joint channel estimation is determined based on this parameter. Certainly, the parameter 0 can also be parameter 1. When parameter 1 is indicated, it is determined not to enable the joint channel estimation, which is not limited herein.

In another embodiment of the disclosure, the configuration information indicating the joint channel estimation can be determined based on DCI (such as DCI format 0_0) with CRC scrambled by the TC-RNTI. In an implementation, the configuration information includes a fixed value for determining whether the joint channel estimation is enabled or disabled. If the fixed value is 0 or 1, it is determined that the joint channel estimation is disabled. If the fixed value is a value other than 1 or 0, it is determined that the joint channel estimation is enabled, and the fixed value is determined as the length of the TDW of the joint channel estimation. In another implementation, the configuration information includes a parameter set for the length of the TDW of the joint channel estimation. The parameter set is specified by a RMSI configuration or a protocol, and its parameter set index is further indicated by the DCI with CRC scrambled by the RA-RNTI. The terminal determines a parameter in the parameter set based on a parameter set index indicated by the network side device, and determines whether to enable the joint channel estimation and the length of the TDW of the joint channel estimation based on this parameter. The parameter set can be a table, which can be a new table or an existing table, such as the Modulation and Coding Scheme (MCS)/TDRA table. If an existing table is used, a field may be newly added in the existing table, such as adding a column. For example, parameters included in the parameter set are [0, 2, 4, 8]. The parameter 0 indicates that the joint channel estimation is disabled. If the parameter is any of the parameters other than 0, it is determined that the joint channel estimation is enabled, and the length of the TDW of the joint channel estimation is determined based on this parameter. Certainly, the parameter 0 can also be parameter 1. When parameter 1 is indicated, it is determined not to enable the joint channel estimation, which is not limited herein.

In an embodiment of the disclosure, as described above, the network side device determines a parameter set or a fixed parameter value of the length of the TDW of the joint channel estimation. Each parameter in the parameter set or the fixed parameter value can be determined based on the number of MSG3 repetitions of the terminal. For example, each parameter in the parameter set or the fixed parameter value is determined to be a common factor of all optional numbers of repetitions. For example, if the optional numbers of repetitions are 4 and 8. It can be determined that parameters in the parameter set are 2 and 4. Or, the fixed parameter value configured is determined to be 4. Certainly, this is only an example, and not a specific limitation of this disclosure.

With the indication method provided in the embodiments of the disclosure, the terminal may be indicated about the TDW for performing the joint channel estimation and that the network side devices enables the joint channel estimation, solving the problem of being unable to indicate to the terminal about the TDW for performing the joint channel estimation and that the joint channel estimation is enabled.

In an embodiment of the disclosure, the terminal determines that the joint channel estimation is enabled based on the received configuration information, and obtains the parameter for the length of the TDW of the joint channel estimation. Performing the joint channel estimation based on the obtained parameter may use the following implementations.

FIG. 16 is a flowchart of an indication method according to an embodiment. As shown in FIG. 16, the indication method is performed by a network side device. This embodiment can be implemented separately, or together with any other embodiment of the disclosure. The method includes the following steps.

At step S151, based on the configuration parameter, a first parameter is determined in the parameter set, or the fixed parameter value is determined as the first parameter.

At step S152, the length of the TDW for performing joint channel estimation is determined based on the first parameter.

In an embodiment of the disclosure, as described above, the configuration parameter is determined, the first parameter is determined in the parameter set, or the fixed parameter value is determined as the first parameter. The length of the TDW for performing the joint channel estimation is determined based on the first parameter. For the convenience of description, a parameter indicated based on the configuration information in the parameter set is referred to as the first parameter.

In an exemplary embodiment of the present disclosure, a parameter set for determining the length of the TDW of the joint channel estimation is obtained in the configuration parameter, and one parameter in the parameter set indicated by the base station is determined as the length of the TDW of the joint channel estimation. Or, a fixed parameter value for determining the length of the TDW of the joint channel estimation is obtained in the configuration parameter, and the parameter value is determined as the length of the TDW for performing the joint channel estimation. For example, the parameter set for determining the length of the TDW of the joint channel estimation includes multiple parameters, such as 2, 4, and 8, respectively. If the parameter indicating the length of the TDW of the joint channel estimation is 4, a duration for performing the joint channel estimation is determined to be 4. The duration can be time slots, that is, the length of the TDW of the joint channel estimation is 4 consecutive time slots. In other words, the network side device performs the joint channel estimation every 4 time slots/repetitions. Here, the duration can also be other schedule time units, which is not limited herein.

In an embodiment of the disclosure, the first parameter is determined as the TDW for performing the joint channel estimation. In the case where a transmission time period of the number of repetitions is less than the length of the TDW of the joint channel estimation, the joint channel estimation can be performed based on different strategies, which may refer to the following embodiments.

In an embodiment of the disclosure, the terminal determines the transmission time period corresponding to the number of repetitions. For example, a message being repeatedly transmitted is MSG3, and the number of MSG3 repetitions is 2. If the determined first parameter is 4, the transmission time period corresponding to the number of repetitions is less than the first parameter. It is determined to perform the joint channel estimation based on the first strategy.

In some embodiments of the disclosure, performing the joint channel estimation based on the first strategy includes canceling the joint channel estimation. That is, in the case where the transmission time period is less than the first parameter, it is determined to cancel enabling the joint channel estimation.

In some embodiments of the disclosure, performing the joint channel estimation based on the first strategy also includes re-determining the length of the TDW of the joint channel estimation based on a predefined rule, and performing the joint channel estimation based on the re-determined length of the TDW.

For example, the transmission time period of the number of repetitions or half of the transmission time period may be re-determined as an actual length of the TDW of the joint channel estimation based on the predefined rule. The transmission time period of the number of repetitions may also be determined as the length of the TDW for performing the joint channel estimation. A fixed value indicated by a communication protocol may be determined as the length of the TDW for performing the joint channel estimation. A value specified by the network side device may also be determined as the length of the TDW for performing the joint channel estimation based on the configuration parameter. A value close to the specified value and less than the transmission time period corresponding to the number of repetitions may also be determined as the TDW for performing the joint channel estimation.

In some embodiments of the disclosure, performing the joint channel estimation based on the first strategy includes re-determining the length of the TDW of the joint channel estimation based on the transmission time period of the number of repetitions. For example, a duration of the joint channel estimation is specified as a common factor of all optional numbers of repetitions, and the TDW for performing the joint channel estimation is determined based on the common factor.

In an embodiment of the disclosure, a transmission time period corresponding to a number of blind retransmissions is determined. If a remaining transmission time period remained after performing the joint channel estimation based on the transmission time period is less than a length of a TDW for performing a next joint channel estimation, it is determined that the second strategy is used to perform the joint channel estimation.

In some embodiments of the disclosure, performing the joint channel estimation based on the second strategy includes canceling the joint channel estimation. That is, in the case where the remaining transmission time period remained after performing the joint channel estimation based on the transmission time period is less than the length of the TDW for performing the next joint channel estimation, it is determined to cancel enabling the joint channel estimation.

In some embodiments of the disclosure, performing the joint channel estimation based on the second strategy includes canceling joint channel estimation in time slots within a remainder of a result of a quotient operation on the transmission time period over the first parameter. In other words, if a transmission time period remained after performing the joint channel estimation based on the transmission time period is smaller than the length of the TDW of the next joint channel estimation, joint channel estimation within the transmission time period remained is canceled.

In some embodiments of the disclosure, performing the joint channel estimation based on the second strategy includes: re-determining the length of the TDW of the joint channel estimation based on a predefined rule, and performing the joint channel estimation based on the re-determined length of the TDW of the joint channel estimation. Further, the terminal determines the lengths of TDWs of joint channel estimation for all repetitions based on the predefined rule. The terminal can re-divide the length of the TDW of the joint channel estimation based on the transmission time period corresponding to the number of repetitions.

In some embodiments of the disclosure, performing the joint channel estimation based on the second strategy includes: re-determining a time period corresponding to the remainder of the result of the quotient operation on the transmission time period and the first parameter based on the predefined rule as the length of the TDW of the joint channel estimation. The terminal performs the joint channel estimation based on the re-determined length of the TDW. The terminal determines the remainder of the result of the quotient operation on the transmission time period and a first duration based on the predefined rule. That is, the remaining transmission time period remained after performing the joint channel estimation is determined. For the remaining transmission time period, a duration of performing a next joint channel estimation may be determined to be consistent with the remaining transmission time period. For example, the repetitions are 14 time slots, the first parameter is 4 time slots, thus, the remainder is 2, and the length of the TDW for performing the last joint channel estimation is determined to be 2.

In some embodiments of the disclosure, performing the joint channel estimation based on the second strategy includes re-determining the length of the TDW for performing the joint channel estimation based on the number of repetitions and the length of the TDW of the joint channel estimation. For example, based on each optional number of repetitions, division is performed to determine an optional length of the TDW of the joint channel estimation.

In an exemplary embodiment of the disclosure, the transmission time period corresponding to the repetitions is determined in the configuration parameter. Further, calculation is performed on the transmission time period based on a predefined operation rule, and an obtained operational value (a relative value) is determined as the second parameter. The second parameter is determined as the length of the TDW for performing the joint channel estimation.

In an embodiment of the disclosure, a quotient operation may be performed on the transmission time period based on a predefined parameter value. For example, the predefined parameter value is 4, the determined transmission time period corresponding to the number of repetitions is 12, and its time unit can be a time slot. Then a duration of performing the joint channel estimation is determined to be 3. In other words, a network side device can repeatedly perform a joint channel estimation every 3 time slots.

In some embodiments of the disclosure, if a relative value of the number of repetitions is determined as the duration of performing the joint channel estimation, there may be a situation where the second parameter is less than a first value and a situation where the second parameter has a corresponding remainder after the quotient operation.

In an embodiment of the disclosure, for the case where the second parameter is less than the first value, the joint channel estimation may be performed based on the third strategy. The first value may be 1. For example, the transmission time period corresponding to the repetitions is 2, and a duration of performing the joint channel estimation indicated by the network side device is 4, where the time can be a time slot. Thus, a second duration is ²⁄₄, the network side device is unable to perform the joint channel estimation.

In some embodiments of the disclosure, performing the joint channel estimation based on the third strategy includes canceling the joint channel estimation. That is, in the case where the second parameter is less than the first value, it is determined to cancel enabling the joint channel estimation.

In some embodiments of the disclosure, performing the joint channel estimation based on the third strategy includes re-determining the second parameter based on a predefined rule. For example, in MSG3 repetition, a duration of performing the joint channel estimation is re-determined. For example, it can be a half of a duration granularity, or a fixed value that is determined to be less than the transmission time period corresponding to the repetitions.

In some embodiments of the disclosure, performing the joint channel estimation based on the third strategy includes re-determining the length of the TDW for performing the joint channel estimation based on the transmission time period corresponding to the repetitions.

In an embodiment of the disclosure, the fourth strategy may be performed in the case where there is a remainder after the quotient operation is performed for the second parameter. For example, the transmission time period of the repetitions is 14 and a relative value of the repetitions is 4, then there is a remainder for operation 14/4, where the time can be a time slot.

In some embodiments of the disclosure, performing the joint channel estimation based on the fourth strategy includes determining a lower bound of a time granularity for performing the joint channel estimation. For example, a duration may be selected as 3 time slots. In other words, the network side device can perform the joint channel estimation for 5 times during actual performing the joint channel estimation, in which, a duration of each of the first 4 joint channel estimations is 3 time slots, and a duration of the last joint channel estimation is 2 time slots. Or, the network side device can perform the joint channel estimation four times, and no joint channel estimation is performed in the remaining 2 time slots.

In some embodiments of the disclosure, performing the joint channel estimation based on the fourth strategy includes determining an integer multiple of the quotient value of the second duration. That is, an integer value of the quotient operation is determined as the length of the TDW for performing the joint channel estimation.

In some embodiments of the present disclosure, performing the joint channel estimation based on the fourth strategy includes re-determining the second duration based on a predefined rule. In other words, a fixed value is redefined based on the predefined rule, by using the fixed value as a benchmark, a relative value by which the transmission time period of the repetitions can be evenly divided is determined as the length of the TDW for performing the joint channel estimation. The relative value can be determined by the protocol or indicated by the network side, and the relative value is less than or greater than the fixed value.

In some embodiments of the disclosure, performing the joint channel estimation based on the fourth strategy includes re-determining the length of the TDW for performing the joint channel estimation based on the transmission time period of the repetitions and the duration granularity of the joint channel estimation.

In some embodiments of the disclosure, performing the joint channel estimation based on the fourth strategy includes canceling the joint channel estimation. That is, in the case that there is a remainder in the result of the quotient operation, it is determined to cancel enabling joint channel estimation.

FIG. 17 is a flowchart of an indication method according to an embodiment. As shown in FIG. 17, the indication method is performed by a network side device, and this embodiment can be implemented separately or together with any other embodiment of the disclosure. The method includes the following steps.

At step S161, assistance information is received.

In an embodiment of the disclosure, the assistance information is used for the network side device to determine a configuration parameter for performing joint channel estimation. The assistance information may be speed information, etc. Different speed information represents different channel state change information. It can assist the network side in making a decision on whether to enable the joint channel estimation based on the channel state change information reported by the terminal, and in making a decision on a length of a TDW for performing the joint channel estimation.

FIG. 18 is a flowchart of an indication method according to an embodiment. As shown in FIG. 18, the indication method is performed by a network side device, and this embodiment can be implemented separately or together with any other embodiment of the disclosure. The method includes the following steps.

At step S171, based on random access MSG1, assistance information is received.

In an embodiment of the disclosure, the network side device may receive the assistance information based on different physical random access channel (PRACH) resource groups in MSG1, and different speed information may be determined. The PRACH resources can be time frequency resources, frequency domain resources, code domain resources, etc. The terminal can send a preamble based on a group corresponding to its own speed to inform a current channel situation of the terminal.

FIG. 19 is a flowchart of an indication method according to an embodiment. As shown in FIG. 19, the indication method is performed by a network side device, and this embodiment can be implemented separately or together with any other embodiment of the disclosure. The method includes the following steps.

At step S181, assistance information is received based on a DMRS.

In an embodiment of the disclosure, the network side device receives the assistance information based on different DMRSs to determine a channel condition of the terminal. The DMRS can be a time domain position, a frequency domain position, a code domain position, etc. It should be noted that, when using the DMRS to report the speed information, joint channel estimation is not performed during the initial transmission process. Or, a configuration parameter of the joint channel estimation indicated by a base station is used for the initial transmission of MSG3. In an embodiment of the disclosure, when the assistance information is used for retransmission, it assists the network side device in making a decision on enabling the joint channel estimation.

FIG. 20 is a flowchart of an indication method according to an embodiment. As shown in FIG. 20, the indication method is performed by a network side device, and this embodiment can be implemented separately or together with any other embodiment of the disclosure. The method includes the following steps.

At step S191, in response to the network side device scheduling the terminal to perform MSG3 repetition, a second message is sent.

In an embodiment of the disclosure, the second message is used to indicate a configuration parameter for the network side device to perform joint channel estimation during a repetition process of the terminal.

In some embodiments of the disclosure, the second message may be the same as the first message, i.e., following the same configuration parameter as the initial transmission, or the same indication mechanism for performing the joint channel estimation. For example, a value of a TDW indicated based on the first message may be applied to both the initial transmission and retransmissions.

In some embodiments of the disclosure, the second message is partially the same as the first message. That is, when the terminal performs MSG3 repetition, partial configuration parameters, or partial indication mechanisms for performing the joint channel estimation of the initial transmission are used. For example, a TDW for performing the joint channel estimation in the initial transmission may be explicitly indicated, and a TDW for the repetitions may be implicitly indicated. The TDW for performing the joint channel estimation for the initial transmission and the TDW for the repetitions may be activated using the same message.

In some embodiments of the disclosure, the second message may be completely different from the first message.

Based on the same/similar concept, the embodiments of the disclosure also provide an indication apparatus.

It can be understood that the indication apparatus provided in the embodiments of the disclosure includes hardware structures and/or software modules corresponding to the execution of each function in order to achieve the above functions. In combination with the units and algorithm steps of respective examples disclosed in the embodiments of the disclosure, the embodiments of the disclosure can be implemented in the form of hardware or a combination of hardware and computer software. Whether a certain function is executed in hardware or computer software driven hardware depends on the specific application and design constraints of the technical solution. Those skilled in the art may use different methods to implement the described functions for each specific application, but such implementations should not be considered beyond the scope of the technical solution of the embodiments of the disclosure.

FIG. 21 is a block diagram of an indication apparatus according to an embodiment. As shown in FIG. 21, the indication apparatus 100 is performed by a terminal, and includes a determining module 101.

The determining module 101 is configured to determine a first message, in which the first message is used to indicate a configuration parameter for a network side device to perform joint channel estimation.

In an embodiment of the disclosure, the configuration parameter includes indication information.

The indication information is used to indicate to the terminal that the network side device enables the joint channel estimation.

In an embodiment of the disclosure, the configuration parameter further includes a parameter set or a fixed parameter value for determining a length of a TDW of the joint channel estimation; in which, the parameter set includes one or more parameters.

In In an embodiment of the disclosure, each parameter in the parameter set or the fixed parameter value is determined based on a number of repetitions.

In In an embodiment of the disclosure, the parameter set or the fixed parameter value is used to determine the length of the TDW of the joint channel estimation.

In In an embodiment of the disclosure, the determining module 10 is configured to: based on the configuration parameter, determine a first parameter in the parameter set or determine the fixed parameter value as the first parameter; and determine the length of the TDW of the joint channel estimation based on the first parameter.

In an implementation, the determining module 101 is configured to: determine the first parameter as the length of the TDW of the joint channel estimation;

or, determine a transmission time period corresponding to the number of repetitions, obtain a second parameter by performing calculation on the transmission time period based on a predefined operation rule, and determine the second parameter as the length of the TDW for performing the joint channel estimation.

In an embodiment of the disclosure, the determining module 101 is configured to: determine the transmission time period corresponding to the number of repetitions, and perform the joint channel estimation based on a first strategy in response to the transmission time period being less than the first parameter;

or, determine a transmission time period corresponding to a number of blind retransmissions, and perform the joint channel estimation based on a second strategy in response to a result of a quotient operation on the transmission time period and the first parameter including a quotient value and a remainder.

In an embodiment of the disclosure, the predefined operation rule is a quotient operation.

The determining module 101 is configured to: determine the transmission time period corresponding to the number of repetitions, and determine a quotient value obtained by dividing the transmission time period by a predefined parameter value as the second parameter.

In an embodiment of the disclosure, the determining module is configured to: perform the joint channel estimation based on a third strategy in response to the second parameter being less than a first value; or, perform the joint channel estimation based on a fourth strategy in response to the second parameter having a corresponding remainder.

In an embodiment of the disclosure, the apparatus further includes a reporting module 102.

The reporting module 102 is configured to report assistance information, in which the assistance information is used for the network side device to determine the configuration parameter for performing the joint channel estimation.

In an embodiment of the disclosure, the reporting module 102 is configured to: report the assistance information based on a random access MSG1; or report the assistance information based on a demodulation reference signal (DMRS).

In an embodiment of the disclosure, the determining module 101 is configured to: receive a second message in response to the network side device scheduling the terminal to perform the MSG3 repetition, in which the second message is used to indicate a configuration parameter for the network side device to perform the joint channel estimation during a repetition process to the terminal.

In an embodiment of the disclosure, the configuration parameter in the second message and the configuration parameter in the first message are the same or partially the same.

In an embodiment of the disclosure, performing the joint channel estimation based on the first strategy includes:

canceling the joint channel estimation; or re-determining the length of the TDW of the joint channel estimation based on a predefined rule, and performing the joint channel estimation based on the re-determined length of the TDW of the joint channel estimation.

In an embodiment of the disclosure, performing the joint channel estimation based on the second strategy includes:

canceling the joint channel estimation; or canceling joint channel estimation within a difference between the transmission time period and a duration; or re-determining the parameter based on a predefined rule, and performing the joint channel estimation based on the re-determined parameter; or re-determining a time period corresponding to a remaining number of blind retransmissions as the length of the TDW based on a predefined rule, and performing the joint channel estimation based on the re-determined length of the TDW.

In an embodiment of the disclosure, the determining module 101 is configured to: determining the length of the TDW based on the transmission time period of the number of repetitions; and performing the joint channel estimation based on the length of the TDW.

In an embodiment of the disclosure, the third strategy includes at least one of:

canceling the joint channel estimation; re-determining the second parameter based on a predefined rule; and re-determining the first parameter.

In an embodiment of the disclosure, the fourth strategy includes at least one of:

determining a lower bound of a time granularity for performing the joint channel estimation; determining an integer multiple of the quotient value of the second parameter; re-determining the second parameter based on a predefined rule; and canceling the joint channel estimation.

In an embodiment of the disclosure, the configuration parameter includes enabling the joint channel estimation.

The first message is determined based on any of:

remaining minimum system information (RMSI); a random access response (RAR); DCI with cyclic redundancy check (CRC) scrambled by a random access radio network temporary identifier (RA-RNTI); DCI with CRC scrambled by a temporary cell radio network temporary identifier (TC-RNTI).

In an embodiment of the disclosure, the configuration parameter includes the length of the TDW of the joint channel estimation.

The first message is determined based on any of:

a predefined rule/communication protocol; RMSI; DCI with CRC scrambled by a RA-RNTI; DCI with CRC scrambled by a TC-RNTI; uplink grant information in an RAR.

In an embodiment of the disclosure, the configuration parameter includes enabling the joint channel estimation and the length of the TDW of the joint channel estimation.

The first message is determined based on any of:

a predefined rule/communication protocol; DCI with CRC scrambled by a RA-RNTI; uplink grant information carried in an RAR; and DCI with CRC scrambled by a TC-RNTI.

FIG. 22 is a block diagram of an indication apparatus according to an embodiment. As shown in FIG. 22, the indication apparatus 300 is performed by a network side device, and includes a determining module 201.

The determining module 201 is configured to determine a first message, in which the first message is used to indicate a configuration parameter for the network side device to perform joint channel estimation.

In an embodiment of the disclosure, the configuration parameter includes indication information.

The indication information is used to indicate to the terminal that the network side device enables the joint channel estimation.

In an embodiment of the disclosure, the configuration parameter further includes a parameter set or a fixed parameter value for determining a length of a TDW of the joint channel estimation; in which the parameter set includes one or more parameters.

In an embodiment of the disclosure, each parameter in the parameter set or the fixed parameter value is determined based on a number of repetitions.

In an embodiment of the disclosure, the parameter set or the fixed parameter value is used to determine the length of the TDW of the joint channel estimation.

In an embodiment of the disclosure, the determining module 201 is configured to: based on the configuration parameter, determine a first parameter in the parameter set or determining the fixed parameter value as the first parameter; and determine the length of the TDW of the joint channel estimation based on the first parameter.

In an embodiment of the disclosure, the apparatus further includes a receiving module 202.

The receiving module 202 is configured to receive assistance information, in which the assistance information is used for the network side device to determine the configuration parameter for performing the joint channel estimation.

In an embodiment of the disclosure, the receiving module 202 is configured to:

receive the assistance information based on a random access MSG1; or receive the assistance information based on a demodulation reference signal (DMRS).

In an embodiment of the disclosure, the determining module 201 is configured to: send a second message in response to the network side device scheduling the terminal to perform MSG3 repetition, in which the second message is used to indicate a configuration parameter for the network side device to perform the joint channel estimation during a repetition process to the terminal.

In an embodiment of the disclosure, the configuration parameter in the second message and the configuration parameter in the first message are the same or partially the same.

In an embodiment of the disclosure, the configuration parameter includes enabling the joint channel estimation.

The first message is determined based on any of:

remaining minimum system information (RMSI); a random access response (RAR); DCI with cyclic redundancy check (CRC) scrambled by a random access radio network temporary identifier (RA-RNTI); DCI with CRC scrambled by a temporary cell radio network temporary identifier (TC-RNTI).

In an embodiment of the disclosure, the configuration parameter includes the length of the TDW of the joint channel estimation.

The first message is determined based on any of:

a predefined rule/communication protocol; RMSI; DCI with CRC scrambled by a RA-RNTI; DCI with CRC scrambled by a TC-RNTI; uplink grant information in an RAR.

In an embodiment of the disclosure, the configuration parameter includes enabling the joint channel estimation and the length of the TDW of the joint channel estimation.

The first message is determined based on any of:

a predefined rule/communication protocol; DCI with CRC scrambled by a RA-RNTI; uplink grant information carried in an RAR; and DCI with CRC scrambled by a TC-RNTI.

Regarding the apparatus in the above embodiments, the specific way in which each module performs its operation has been described in detail in the method embodiments, and will not be described in detail here.

FIG. 23 is a block diagram of a device 300 for indication provided by an embodiment of the disclosure. For example, the device 300 may be a mobile phone, a computer, a digital broadcasting terminal, a message transceiver device, a game console, a tablet device, a medical device, a fitness device, and a personal digital assistant.

As illustrated in FIG. 23, the device 300 may include at least one of the following components: a processing component 302, a memory 304, a power component 306, a multimedia component 308, an audio component 310, an input/output (I/O) interface 33, a sensor component 314, and a communication component 316.

The processing component 302 typically controls overall operations of the terminal device 300, such as the operations associated with display, telephone calls, data communications, camera operations, and recording operations. The processing component 302 may include at least one processor 320 to perform all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time duration and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each of the front-facing camera and the rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of a user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a Complementary Metal Oxide Semiconductor (CMOS) or Charge-Coupled Device (CCD) image sensor, for using in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G or 3G, or a combination thereof. In an embodiment, the communication component 316 receives a broadcast signal from an external broadcast management system or broadcast associated information via a broadcast channel. In an embodiment, the communication component 316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiments, the device 300 may be implemented by at least one Application Specific Integrated Circuit (ASIC), Digital Signal Processor (DSP), Digital Signal Processing Device (DSPD), Programmable Logic Device (PLD), Field Programmable Gate Array (FPGA), controller, micro-controller, microprocessor or other electronic components, for performing the above described methods.

In the embodiments, there is also provided a non-transitory computer readable storage medium including instructions, such as the memory 304, executable by the processor 320 in the device 300, for performing the above method. For example, the non-transitory computer-readable storage medium may be a ROM, a Random Access Memory (RAM), a CD-ROM, a magnetic tape, a floppy disc, and an optical data storage device.

Figure 24:
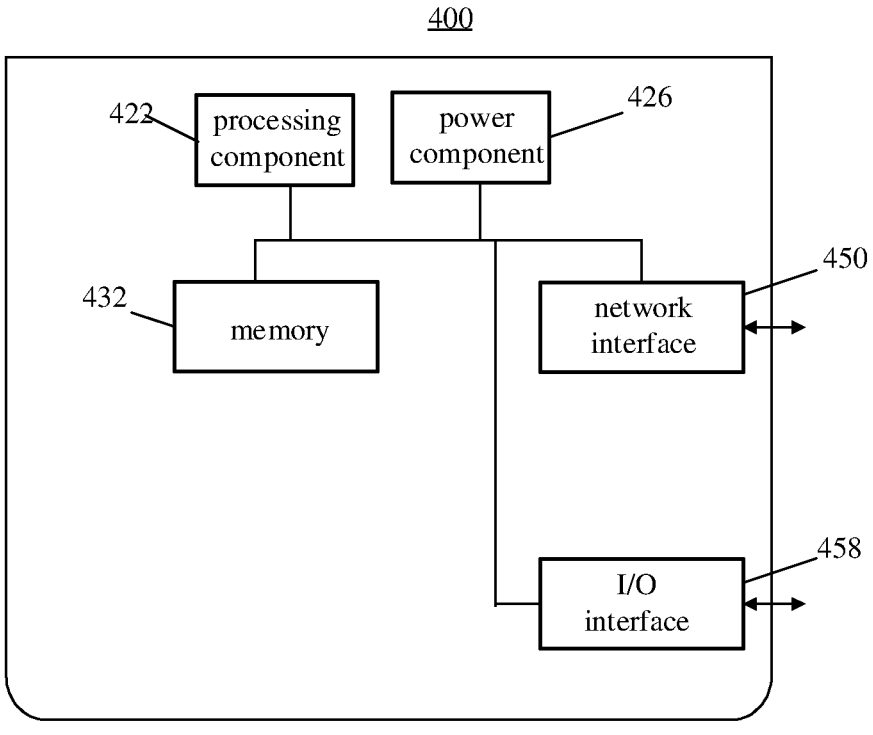
FIG. 24 is a block diagram of a device for indication according to an embodiment of the disclosure.

FIG. 24 is a block diagram of a device 400 for indication provided by an embodiment of the disclosure. As illustrated in FIG. 24, the device 400 includes a processing component 422 consisting of one or more processors, and memory resources represented by a memory 432 for storing instructions that may be executed by the processing component 422, such as applications. The applications stored in the memory 432 may include one or more modules each corresponding to a set of instructions. In addition, the processing component 422 is configured to execute the instructions to perform any of the methods described above.

The device 400 may also include a power component 426 configured to perform power management of the device 400, a wired or wireless network interface 450 configured to connect the device 400 to a network, and an input-output (I/O) interface 458. The device 400 may operate based on an operating system stored in the memory 432, such as Windows Server™, Mac OS X™, Unix™, Linux™, Free-BSD™, or the like.

It can be further understood that, the term "plurality of" in the disclosure refers to two or more, and other quantifiers are similar to it. The term "and/or" describes an association relationship of between associated objects, indicating that there can be three types of relationships. For example, A and/or B, can represent: the existence of A alone, the existence of A and B simultaneously, and the existence of B alone. The character "/" generally indicates that the associated objects are in an "or" relationship. The singular forms of "a", "said", and "the" are intended to include plural forms, unless the context clearly indicates other meanings.

It can be further understood that, the terms "first", "second", and the like may be used to describe various information, the information should not be limited to these terms. These terms are only used to distinguish the same type of information from each other, and do not indicate a specific order or degree of importance. In fact, expressions such as "first" and "second" can be used interchangeably. For example, without departing from the scope of this disclosure, the first information may also be referred to as the second information, and similarly, the second information may also be referred to as the first information.

It can be further understood that, in the disclosure, although the operations are described in a specific order in the accompanying drawings, they should not be understood as requiring the execution of these operations in the specific or serial order shown, or requiring the execution of all shown operations to obtain the desired results. In specific environments, multitasking and parallel processing may be advantageous.

Other implementations of the disclosure will be apparent to those skilled in the art from consideration of the specification and practice of the disclosure disclosed here. This disclosure is intended to cover any variations, usages, or adaptations of the disclosure following the general principles thereof and including such departures from the disclosure as come within known or customary practice in the art. It is intended that the specification and examples are considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An indication method, performed by a terminal, comprising:

determining a first message, wherein the first message indicates a configuration parameter of joint channel estimation of a network device, the configuration parameter comprises indication information and at least one of a parameter set or a fixed parameter value for determining a length of a Time Domain Window (TDW) of the joint channel estimation, and the indication information indicates that the joint channel estimation is enabled;

based on the configuration parameter, determining a first parameter in the parameter set or determining the fixed parameter value as the first parameter; and determining the length of the TDW of the joint channel estimation based on the first parameter, wherein determining the length of the TDW of the joint channel estimation based on the first parameter includes:

determining a transmission time period corresponding to a number of repetitions, obtaining a second parameter by performing calculation on the transmission time period based on a predefined operation rule, and determining the second parameter as the length of the TDW for performing the joint channel estimation.

2. The indication method according to claim 1, wherein each parameter in the parameter set or the fixed parameter value is determined based on a number of repetitions.

3. The indication method according to claim 1 wherein determining the length of the TDW of the joint channel estimation based on the first parameter includes:

determining the first parameter as the length of the TDW of the joint channel estimation.

4. The indication method according to claim 3, wherein the first parameter is determined as the length of the TDW of the joint channel estimation, the method further comprising one of:

determining the transmission time period corresponding to the number of repetitions, and performing the joint channel estimation based on a first strategy in response to the transmission time period being less than the first parameter; or determining a transmission time period corresponding to a number of blind retransmissions, and performing the joint channel estimation based on a second strategy in response to a remainder being obtained by dividing the transmission time period by the first parameter.

5. The indication method according to claim 4, wherein performing the joint channel estimation based on the first strategy comprises one of:

canceling the joint channel estimation; or re-determining the length of the TDW of the joint channel estimation based on a predefined rule, and performing the joint channel estimation based on the re-determined length of the TDW of the joint channel estimation.

6. The indication method according to claim 4, wherein performing the joint channel estimation based on the second strategy comprises one of:

canceling the joint channel estimation;

canceling a part of the joint channel estimation within the obtained remainder;

re-determining the parameter based on a predefined rule, and performing the joint channel estimation based on the re-determined parameter; or re-determining a time period corresponding to a remaining number of blind retransmissions as the length of the TDW based on a predefined rule, and performing the joint channel estimation based on the re-determined length of the TDW.

7. The indication method according to claim 1, wherein the predefined operation rule is a quotient operation; and obtaining the second parameter by performing calculation on the transmission time period based on the predefined operation rule comprises:

determining the transmission time period corresponding to the number of repetitions, and determining a quotient value obtained by dividing the transmission time period by a predefined parameter value as the second parameter.

8. The indication method according to claim 7, wherein the second parameter is determined as the length of the TDW of the joint channel estimation, the method further comprising one of:

performing the joint channel estimation based on a third strategy in response to the second parameter being less than a first value; or performing the joint channel estimation based on a fourth strategy in response to the transmission time period being not divisible by the second parameter.

9. The indication method according to claim 8, wherein performing the joint channel estimation based on the third strategy comprises at least one of:

canceling the joint channel estimation;

re-determining the second parameter based on a predefined rule; or re-determining the first parameter.

10. The indication method according to claim 8, wherein performing the joint channel estimation based on the fourth strategy comprises at least one of:

determining a lower bound of a time granularity for performing the joint channel estimation;

determining an integer multiple of the quotient value of the second parameter;

re-determining the second parameter based on a predefined rule; or canceling the joint channel estimation.

11. The indication method according to claim 1, further comprising:

receiving a second message in response to the network device scheduling the terminal to perform MSG3 repetition, wherein the second message indicates a configuration parameter for the network device to perform the joint channel estimation during a repetition process to the terminal, wherein the configuration parameter in the second message and the configuration parameter in the first message are the same or partially the same.

12. The indication method according to claim 1, wherein the configuration parameter comprises enabling the joint channel estimation; and the first message is determined based on at least one of: remaining minimum system information (RMSI); a random access response (RAR); downlink control information (DCI) with cyclic redundancy check (CRC) scrambled by a random access radio network temporary identifier (RA-RNTI); or DCI with CRC scrambled by a temporary cell radio network temporary identifier (TC-RNTI);

wherein the configuration parameter comprises the length of the TDW of the joint channel estimation; and the first message is determined based on at least one of: a predefined rule/communication protocol; RMSI; DCI with CRC scrambled by a RA-RNTI; DCI with CRC scrambled by a TC-RNTI; or uplink grant information in an RAR; or wherein the configuration parameter comprises enabling the joint channel estimation and the length of the TDW of the joint channel estimation; and the first message is determined based on at least one of: a predefined rule/communication protocol; DCI with CRC scrambled by a RA-RNTI; uplink grant information carried in an RAR; or DCI with CRC scrambled by a TC-RNTI.

13. An indication method, performed by a network device, comprising:

determining a first message, wherein the first message indicates a configuration parameter for the network device to perform joint channel estimation, the configuration parameter comprises indication information and at least one of a parameter set or a fixed parameter value for determining a length of a Time Domain Window (TDW) of the joint channel estimation, and the indication information indicates that the joint channel estimation is enabled, wherein the configuration parameter is used for determining a first parameter in the parameter set or determining the fixed parameter value as the first parameter, the first parameter is used for determining the length of the TDW of the joint channel estimation, and determining the length of the TDW of the joint channel estimation includes:

determining a transmission time period corresponding to a number of repetitions, obtaining a second parameter by performing calculation on the transmission time period based on a predefined operation rule, and determining the second parameter as the length of the TDW for performing the joint channel estimation.

14. The indication method according to claim 13, wherein each parameter in the parameter set or the fixed parameter value is determined based on a number of repetitions; or the method further comprises:

based on the configuration parameter, determining a first parameter in the parameter set or determining the fixed parameter value as the first parameter; and determining the length of the TDW of the joint channel estimation based on the first parameter.

15. The indication method according to claim 13, further comprising:

receiving assistance information for the network device to determine the configuration parameter for performing the joint channel estimation.

16. A terminal, comprising:

a processor; and a memory for storing instructions executable by the processor;

wherein the processor is configured to:

determine a first message, wherein the first message indicates a configuration parameter of joint channel estimation of a network device, the configuration parameter comprises indication information and at least one of a parameter set or a fixed parameter value for determining a length of a Time Domain Window (TDW) of the joint channel estimation, and the indication information indicates that the joint channel estimation is enabled;

based on the configuration parameter, determine a first parameter in the parameter set or determining the fixed parameter value as the first parameter; and determine the length of the TDW of the joint channel estimation based on the first parameter, wherein determining the length of the TDW of the joint channel estimation based on the first parameter includes:

determining a transmission time period corresponding to a number of repetitions, obtaining a second parameter by performing calculation on the transmission time period based on a predefined operation rule, and determining the second parameter as the length of the TDW for performing the joint channel estimation.

17. A network device, comprising:

a processor; and a memory for storing instructions executable by the processor;

wherein the processor is configured to perform the indication method according to claim 13.

* * * * *